(12) United States Patent
Wu et al.

(10) Patent No.: US 9,578,144 B2
(45) Date of Patent: Feb. 21, 2017

(54) LAYER 7 APPLICATION CLASSIFICATION

(71) Applicant: Aerohive Networks, Inc., Sunnyvale, CA (US)

(72) Inventors: Yufeng Wu, Milpitas, CA (US); Yunlei Yang, Fremont, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 399 days.

(21) Appl. No.: 14/210,211

(22) Filed: Mar. 13, 2014

(65) Prior Publication Data

US 2014/0280514 A1   Sep. 18, 2014

Related U.S. Application Data

(60) Provisional application No. 61/800,521, filed on Mar. 15, 2013.

(51) Int. Cl.
*H04L 29/08* (2006.01)

(52) U.S. Cl.
CPC ................ *H04L 69/329* (2013.01)

(58) Field of Classification Search
CPC ....... H04L 69/329; H04L 69/32; H04L 69/16; H04L 69/18; H04L 41/0893; H04L 41/5025; H04L 41/5003
USPC .......................................... 709/203
See application file for complete search history.

(56) References Cited

U.S. PATENT DOCUMENTS

| 2012/0084184 A1* | 4/2012 | Raleigh | H04M 15/7652 |
| | | | 705/30 |
| 2012/0167162 A1* | 6/2012 | Raleigh | G06F 21/57 |
| | | | 726/1 |

\* cited by examiner

*Primary Examiner* — Tu Nguyen
(74) *Attorney, Agent, or Firm* — Sheppard, Mullin, Richter & Hampton LLP

(57) ABSTRACT

Maintaining layer 7 state as a client device roams between network devices during a session. Data packets used in executing a layer 7 application are received at a first network device that a client device is coupled to during a session. Data packets received by the first network device are stored in a layer 7 application buffer that is sent to a second network device that a client device roams to during a session. A layer 7 application buffer is used to classify a layer 7 application that is the subject of a session in order to maintain layer 7 state as a client device roams to a second network device during a session.

20 Claims, 10 Drawing Sheets

LAYER 7 APPLICATION CLASSIFICATION

CROSS REFERENCE TO RELATED APPLICATIONS

This application claims priority to U.S. Provisional Patent Application Ser. No. 61/800,521, filed Mar. 15, 2013, entitled "LAYER 7 FEATURE CLASSIFICATION WHILE ROAMING," which is incorporated herein by reference.

BACKGROUND

An area of ongoing research and development is in improving performance of communication over a network, and in particular a wireless network. Some wireless networks are governed by IEEE 802.11 standards. While not all networks need to use all of the standards associated with 802.11, a discussion of the standards by name, such as 802.11n provides, at least partly because the standards are well-known and documented, a useful context in which to describe issues as they relate to wireless systems.

An important aspect of providing wireless services is in ensuring that service interruption or failure is avoided when roaming. Roaming is when a wireless device transitions from one access point on a wireless network to another access point on the same wireless network. During hand-off, Layer 2 (hereinafter referred to as "L2"), Layer 3 (hereinafter referred to as "L3"), and Layer 4 (hereinafter referred to as "L4") features, such as quality of service (QoS), firewall, etc. are maintained by, typically, synching L2 to L4 session information to the access point to which a wireless device roams.

Layer 7 (hereinafter referred to as "L7") information is stateful. Deep packet inspection (DPI) technology often requires scanning into payload of a subplurality of packets of 5-tuple based internet protocol (IP) sessions to identify application information. Application information can be used to manage and maintain L7 application based features, such as QoS, firewall, etc. The number of packets and sessions needed to accurately identify application information varies from application to application. A challenge of synchronizing L7 applications of 5-tuple IP sessions between access points (APs) is at least in part because roaming can occur at any time, and when it does occur it can interrupt ongoing DPI classification. For example, it typically takes about 10 packets to accurately identify an Apple FACETIME® session; so if roaming occurs after a first packet is received but before the first 10 packets are received from the roaming client, the AP receiving the packets will not be able to complete its classification of the application. Similarly, the AP to which the client roams will be unable to perform its classification of the application because it did not receive at least the first packet. Accordingly, a user of a roaming client device can experience session drop, network latency, bandwidth congestion due to incorrect firewall or QoS policies as a result of missing L7 application information, causing degradation of the user experience particularly with long-lived sessions such as video streaming, file transfers, VoIP teleconferences, and the like.

The foregoing examples of the related art and limitations related therewith are intended to be illustrative and not exclusive. For example, wireless clients may use different protocols other than 802.11, potentially including protocols that have not yet been developed. However, problems associated with multiple authentications may persist. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for maintaining L7 state as a client device roams between network devices during a session. In various implementations, data packets used in executing an L7 application are received at a first network device that a client device is coupled to during a session. Further in various implementations, data packets received by the first network device are stored in an L7 application buffer that is sent to a second network device that a client device roams to during a session. In various implementations, an L7 application buffer is used to classify an L7 application that is the subject of a session in order to maintain L7 state as a client device roams to a second network device during a session.

These and other advantages will become apparent to those skilled in the relevant art upon a reading of the following descriptions and a study of the several examples of the drawings.

DETAILED DESCRIPTION

Figure 1:
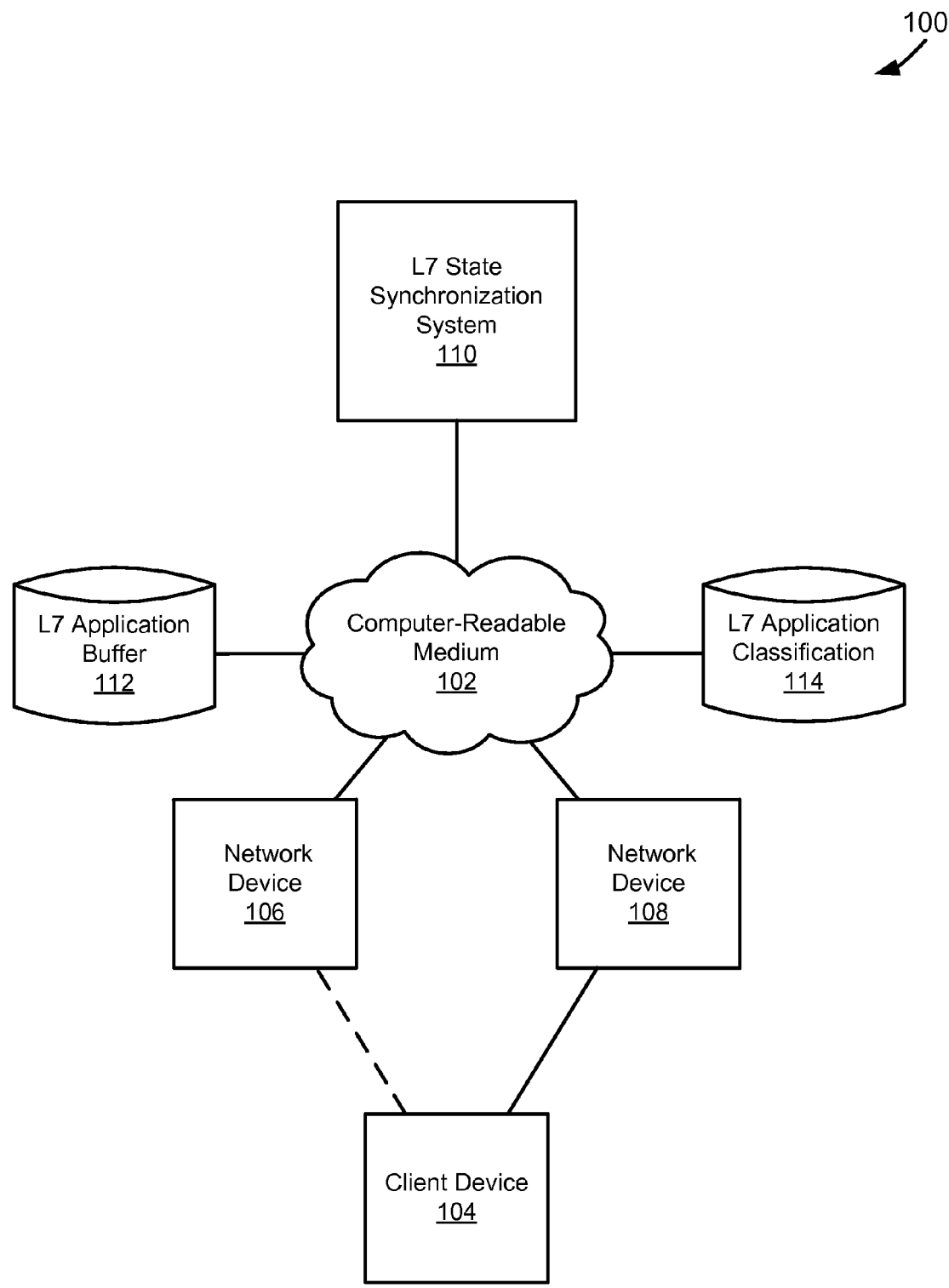
FIG. 1 depicts a diagram of an example of a system for maintaining L7 state as a client device roams between network devices during a session.

FIG. 1 depicts a diagram 100 of an example of a system for maintaining L7 state as a client device roams between network devices during a session. The example system shown in FIG. 1 includes a computer-readable medium 102, a client device 104, a network device 106, a network device 108, an L7 state synchronization system 110, an L7 application buffer datastore 112, and an L7 application classification datastore 114.

In the example system shown in FIG. 1, the network device 106, the network device 108, the L7 state synchronization system 110, the L7 application buffer datastore 112, and the L7 application classification datastore 114, are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a network.

Assuming the computer-readable medium 102 includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a computer-readable medium 102 that may or may not include more than one private network.

The computer-readable medium 102, the client device 104, the network devices 106 and 108, the L7 state synchronization system 110, and other systems, or devices described in this paper can be implemented as a computer system or parts of a computer system or a plurality of computer systems. A computer system, as used in this paper, is intended to be construed broadly and can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g.

"direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration-specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the client device 104 is an applicable device that functions to send data to and receive data from a network. The client device 104 can send and receive data through a network device that is part of a network. Depending upon implementation-specific, or other considerations, the client device 104 can be a thin client device or an ultra-thin client device. Data sent and receive by the client device 104 can be used in the execution of L7 applications on the client device 104.

In a specific implementation, the network devices 106 and 108 function to transmit data between a client device and a network. In transmitting data between a client device and a network, the network devices 106 and 108 can couple the client device to the network. A network device, as used in this paper, can be an access point and/or a router. Data transmitted by the network devices 106 and 108 can be used in the execution of an L7 application, e.g. Apple FACE-TIME®, on the client device.

In the example system shown in FIG. 1, the client device 104 is originally coupled to the network device 106, illustrated by a dashed line, and roams to decouple from the network device 106 and become coupled to the network device 108. In coupling to the network device 106 and the network device 108, the client device 104 can form part of a network, e.g. a LAN, with the network device 106 and 108. Network devices described in this paper, including the network device 106 and 108, include applicable systems and engines to support handoff of a client device as a client device roams between network devices. The systems and engines implemented as part of network devices described in this paper to support handoff as a client device roams between network devices can function according to an applicable standard for supporting handoff of the client device as it roams, such as IEEE 802.11 including IEEE 802.11r-2008, which is incorporated by reference.

In a specific implementation, the client device 104 includes a station and is coupled to the network devices 106 and/or 108 through a wireless connection. A station, as used in this paper, can be referred to as a device with a media access control (MAC) address and a physical layer (PHY) interface to a wireless medium that complies with the IEEE 802.11 standard. Thus, for example, the network devices 106 and 108 can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium. It may be noted that "roaming client device" is chosen as the description of the client device 104 because it is described in the context of the example as a device that roams from network device to another. However, other devices (not shown) coupled to one or the other network device may or may not roam.

In a specific implementation, in which the client device 104 is coupled to either or both the network device 106 and the network device 108 through a wireless connection, applicable devices, systems and engines described in this paper, e.g. the L7 state synchronization system 110, may or may not be IEEE 802 standards compatible or IEEE 802 standards-compliant. As used in this paper, IEEE 802 standards-compatible or IEEE 802 standards-compliant complies with at least some of one or more of the incorporated documents' requirements and/or recommendations, or requirements and/or recommendations from earlier drafts of the documents, and includes Wi-Fi systems.

In a specific implementation, the network devices 106 and 108 function to manage, at least in part, L7 application based features. L7 application based features managed by the network devices 106 and 108 include policies and techniques for applying policies associated with executing L7 applications. L7 application based features, as used herein, are features associated with executing an L7 application using data received from a network. Examples of L7 application based features include QoS and firewall management, traffic shaping, real-time monitoring and reporting, policy routing, or proxy implementation. For example, the network devices 106 and 108 can implement application firewalls to block data of a certain type, e.g. Facebook® applications, from being transmitted to and from the client device 104. In another example, the network devices 106 and 108 can implement traffic shaping in delaying transmission of packets of a certain device that are received at the network devices 106 and 108.

In this paper, the term "packet" is used generally to describe frames, datagrams, or other units of data transmitted through a computer-readable medium. If a more precise term is desired, reference to, e.g., a frame will be made. For example, in an 802.11 context, the packets transmitted between stations of a network are often referred to as "frames."

In a specific implementation, the L7 state synchronization system 110 functions to enable the client device 104 to roam from the network device 106 to the network device 108 while L7 state is maintained. As used herein L7 state is a specific point in a session for execution of an L7 application, hereinafter referred to as a session. A session is the transmission of packets of data to the client device 104 to initiate and continue execution of an L7 application on the client device 104. An L7 state can be represented as the number of data packets that have been transmitted through the network devices 106 and 108 during a session. For example, if 5 specific data packets haven been transmitted to and from the client device 104 through the network devices 106 and/or 108 during a, then the L7 state can be that the 5 specific data packets have been transmitted during the session. A session can be uniquely associated to an L7 application that is the subject of the session through the transmission of data packets to the client device 104. Depending upon implementation-specific or other considerations, at least a portion of the L7 state synchronization system 110 can be implemented on the network device 106 and 108. Further depending upon implementation-specific or other considerations, at least a portion of the L7 state synchronization system 110 can be implemented as a cloud-based computing system or engine, of which at least a portion of the L7 state synchronization system 110 is implemented remote from the network devices 106 and 108, e.g. on cloud-based computing systems.

In a specific implementation, the L7 state synchronization system 110 functions to analyze data parts of data packets transmitted through the network devices 106 and 108 to and from the client device 104 during a session. For example, the L7 state synchronization system 110 can perform deep packet inspection (Hereinafter referred to as "DPI") in analyzing the data parts of data packets transmitted through the network device 106 and 108 during a session. Additionally, the L7 state synchronization system 110 can function to analyze the headers of data packets along with data parts of the data packets. In analyzing data parts, and potentially headers, of data packets transmitted during a session, the L7 state synchronization system 110 can determine application information of a specific L7 application that is that is the subject of a session. Application information can include what type of session packets are transmitted in, e.g. http session. Application information can also include an identification of an L7 application, a creator of an L7 application, resources on the client device 104 needed to execute the L7 application, applications or operating systems that need to be executed on the client device 104 to support execution of the L7 application, a number of packets that need to have data parts analyzed in order to determine the identification of the application, the type of content displayed in executing the L7 application, and web applications that are used in executing the L7 application during a session. Depending upon implementation-specific or other considerations, the L7 state synchronization system 110 can continue to analyze data parts of packets transmitted through the network devices 106 and 108 during a session. Further depending upon implementation-specific or other considerations, the L7 state synchronization system 110 can stop analyzing data parts of packets transmitted through the network devices 106 and 108 during a session, when specific application information is discovered. For example, the L7 state synchronization system 110 can be configured to stop analyzing data parts of packets transmitted during a session through the network devices 106 and 108 once an identification of an L7 application that is the subject of packets sent during the session is determined.

In a specific implementation, application information determined by the L7 state synchronization system 110 during a session can be used to classify an L7 application that is the subject of the session. The L7 state synchronization system 110 can classify 110 can classify an L7 application that is the subject of a session based on application information determined for a session. For example, the L7 state synchronization system 110 can classify an L7 application that is the subject of a session based on a type of session, e.g. http session or a streaming session. Additionally, the L7 state synchronization system 110 can classify an L7 application that is the subject of a session based on an identification of the L7 application that is the subject of the session. For example, the L7 state synchronization system 110 can classify an L7 application as an Apple FACETIME®, if it is identified as an Apple FACETIME® application. Further, the L7 state synchronization system 110 can classify an L7 application based on web applications used in executing the L7 application during a session. For example, if a user uses YouTube® while executing an L7 application, web browser, during a session, then the L7 state synchronization system 110 can classify the L7 application as a YouTube® session.

In a specific implementation, classifications of L7 applications determined by the L7 state synchronization system 110 can be stored as classification information in the L7 application classification datastore 114. Depending upon implementation specific or other considerations, parts or the entire L7 application classification datastore 114 can reside locally on the network devices 106 and 108. Further depending upon implementation-specific or other considerations, parts or the entire L7 application classification datastore 114 can reside remote from the network device 106 and 108, e.g. in the cloud.

In a specific implementation, the network devices 106 and 108 manage L7 application based features according to classifications of L7 applications. Specifically, the network devices 106 and 108 can use classification information stored in the L7 application classification datastore 114 to manage L7 application based features. In managing L7 application based features according to classifications of L7 applications, the network devices 106 and 108 can enforce policies in managing the transmission of packets during a session to the client device 104. For example, if a network policy states that YouTube® is not allowed to be executed as a web application on a client device 104, and an L7 application that is the subject of a session is classified as a YouTube® session, then the network devices 106 and 108 can halt the transmission of packets to the client device 104 during the session. Further in the example, in halting the transmission of packets to the client device 104 during the session, the network devices 106 and 108 can halt the transmission of all packets during the session, or just the packets related to a YouTube® session. Additionally, in managing L7 application based features according to classification of L7 applications, the network devices 106 and 108 can manage and enforce policies used in traffic shaping. For example, if classification information identifies an L7 application that is a low priority application, then the network device 106 and 108 can delay transmission of packets in a session for executing the L7 application.

In a specific implementation, the L7 state synchronization system 110 functions to store data packets received during a session as an L7 application buffer in an L7 application buffer datastore 112. The L7 state synchronization system 110 can analyze data parts of data packets that are stored in the L7 application buffer datastore 112 to determine application information used to classify L7 applications that are the subject of the data packets. In classifying an L7 application using application information the L7 state synchronization system 110 may or may not be able to determine application information sufficient to classify the L7 application unless it receives a certain number of data packets. Similarly, in classifying an L7 application, the L7 state synchronization system 110 may or may not be able to determine application information sufficient to classify the L7 application unless it receives certain packets (e.g. the first 'n' packets transmitted through the network devices 106 and 108 during a session).

In a specific implementation, in order to enable the L7 state synchronization system 110 to classify an L7 application when it is necessary to consider a first subplurality of packets of a session, the L7 state synchronization system 110 can store data packets of a session in the L7 application buffer datastore 112 to form an L7 application buffer. Data packets included in an L7 application buffer stored in the L7 application buffer datastore 112 can be used to classify an L7 application. An L7 application buffer may or may not be limited to a particular size, such as 10 packets. Application information sufficient to classify an L7 application can usually be determined with the first 5 to 20 packets, however sometimes 30, 40, or even 50 are required for certain L7 applications (e.g. Skype®). The choice regarding L7 application buffer size will likely be constrained by hardware costs, but is unlikely to be much larger than 50 in any case, without a change that results in the need for larger L7 application buffers for the purpose of L7 application classification. So an L7 application buffer size of less than 60 is seen as a reasonable upper limit given the state of the art, and 10 is seen as a cost-effective buffer that is adequate to identify all application information used to classify an L7 application completely. Because after about the fourth packet it can be determined whether the session is HTTP, it may even be desirable to limit L7 application buffer size for cost reduction to as little as 5 packets, which would generally enable partial classification of L7 applications.

In a specific implementation, a size of an L7 application buffer in the L7 application buffer datastore 112 is adjustable. For example, a systems administrator may be able to adjust an L7 application buffer size as desired, within hardware constraints. An L7 application buffer size can also be changed dynamically as data packets are added to the L7 application buffer during a session (e.g., a buffer size 5 could be extended to 20). For example, an L7 application buffer size can be dynamically increased until an L7 application can be classified. An L7 application buffer size can be changed dynamically as data packets are added to the L7 application buffer during a session based on a level or a desired classification level for an L7 application. For example, if a desired classification level is determining a web application that is executed in a web browser, then an L7 application buffer size can be dynamically increased until a sufficient amount of application information is determined from the L7 application buffer to identity the web application. In dynamically changing an L7 application buffer size for an L7 application, the size can be changed according to a confidence score. For example, if a confidence score indicates that there is a 50% chance that a desired classification level can be determined from an amount of application information determined form data packets in an L7 application buffer, then the L7 state synchronization system 110 can continue adding packets to the L7 application buffer, thereby dynamically increasing its size.

In a specific implementation, the L7 application buffer datastore 112 can reside on a network device. For example, the L7 application buffer datastore 112 can reside on the network device 106 and the L7 state synchronization system 110 can store data packets transmitted through the network device 106 in the L7 application buffer datastore 112 residing on the network device 106 to create an L7 application buffer. In another implementation, the L7 application buffer datastore 112 can reside remotely from a network device, e.g. in the cloud. For example, the L7 application buffer datastore 112 can reside remote from the network device 106, e.g. in the cloud, and the L7 state synchronization system 110 can store data packets transmitted through the network device 106 in the L7 application buffer datastore 112 residing remote from the network device 106 to create an L7 application buffer.

In a specific implementation, the L7 state synchronization system 110 functions to maintain L7 state when the client device roams and decouples from a network device, e.g. network device 106, and couples to a new network device, e.g. network device 108. In maintaining L7 state, the L7 state synchronization system 110 can access an L7 application buffer stored in the L7 application buffer datastore 112. Depending upon implementation-specific or other considerations, if an L7 application is classified during a session before the client device 104 roams to the network device 108, for example a sufficient number of data packets are transmitted to classify the L7 application to a desired classification level, then the L7 state synchronization system 110 does not have to access an L7 application buffer stored in the L7 application buffer datastore 112 to maintain L7 state. Instead, the L7 state synchronization system 110 can determine a classification of an L7 application from classification information stored in the L7 application classification datastore 114 and manage L7 application based features using the classification, in order to maintain L7 state.

In a specific implementation, in maintaining L7 state using an L7 application buffer, the L7 state synchronization system can analyze data parts of data packets included in the L7 application buffer and data packets transmitted through a network device, e.g. network device 108, that the client device 104 roams to during a session. The L7 state synchronization system can analyze data parts of data packets included as part of an L7 application buffer accessed from the L7 application buffer datastore 112. In analyzing data parts of data packets included in an L7 application buffer and transmitted through a network device, e.g. network device 108, that the client device 104 roams to during a session, the L7 state synchronization system 110 can determine application information of an L7 application that is the subject of a session. Application information determined from both an L7 application buffer and data packets transmitted through a network device, e.g. network device 108, that the client device 104 roams to during a session, can be used to classify an application that is the subject of the session. In using an L7 application buffer to classify an L7 application when a client device 104 roams during a session, the L7 state synchronization system 110 is aware of packets that are transmitted during a session, and L7 state can be maintained as a client device 104 roams. In the example system shown in FIG. 1, while the L7 state synchronization system 110 is shown to maintain L7 state as a client device roams between two network devices, in various other implementations, the L7 state synchronization system 110 can maintain L7 state as a client device roams between more than two network devices.

In a specific implementation, at least a portion of the L7 state synchronization system 110 is implemented, at least in part, remote from network devices 106 and 108 in accessing an L7 application buffer stored in the L7 application buffer datastore 112 and maintaining L7 state when the client device 104 roams from the network device 106 to the network device 108. For example, the L7 state synchronization system 110 can be implemented in a cloud-based system that retrieves an L7 application buffer stored in the L7 application buffer datastore 112 in maintaining L7 state when the client device 104 roams between network devices. Further depending upon implementation-specific or other considerations, the L7 state synchronization system 110 can retrieve an L7 application buffer stored in the L7 application buffer datastore 112 that is implemented remote from the network devices 106 and 108, as a cloud-based datastore.

In a specific implementation, the L7 state synchronization system 110 is implemented, at least in part, on the network devices 106 and 108, in accessing an L7 application buffer stored in the L7 application buffer datastore 112 and maintaining L7 state when the client device 104 roams from the network device 106 to the network device 108. In maintaining L7 state, a portion of the L7 state synchronization system 110 implemented on or associated with the network device 108 can access an L7 application buffer for a session, when the client device 104 roams to the network device 108 from the network device 106 during the session. Depending upon implementation-specific or other considerations, in accessing an L7 application buffer, a first portion of the L7 state synchronization system 110 implemented on or associated with the network device 106 can send the L7 application buffer stored in the L7 application buffer datastore 112 to a second portion of the L7 state synchronization system 110 implemented on or associated with the network device 108. A first portion of the L7 state synchronization system 110 implemented on or associated with the network device 106 can send an L7 application buffer in response to a request for the L7 application buffer received form a second portion of the L7 state synchronization system 110 implemented on or associated with the network device 108. A first portion of the L7 state synchronization system 110 implemented on or associated with the network device 106 can send an L7 application buffer to a second portion of the L7 state synchronization system 110 implemented on or associated with the network device 108, after receiving a notification that a client device has roamed to the network device 108 during a session. Further depending upon implementation-specific or other considerations, a second portion of the L7 state synchronization system 110 implemented on or associated with the network device 108 can access an L7 application buffer stored in the L7 application buffer datastore 112 by directly retrieving the L7 application buffer form the L7 application buffer datastore 112.

In a specific implementation, the L7 application buffer datastore 112 can be implemented on either or both of the network devices 106 and 108 or remote from the network devices 106 and 108. In an example where the application buffer datastore 112 is implemented on the network device 106, a first portion of the L7 state synchronization system 110 implemented on or associated with the network device 106 can access and send an L7 application buffer stored in a L7 application buffer datastore 112 to a second portion of the L7 state synchronization system 110 implemented on or associated with the network device 108. In another example, a second portion of the L7 state synchronization system 110 implemented on or associated with the network device 108 can access an L7 application buffer datastore 112 implemented on the network device 106 to retrieve an L7 application buffer.

In an example of operation, consider a user of the client device 104 initiates a web browser executing a web application that is a YouTube® application just before roaming from the network device 106 to the network device 108. In the example of operation, the network device 106 is aware of initial packets transmitted in the YouTube® session, which, alone, is insufficient to classify the L7 application as running a YouTube® web application. Further in the example of operation, the network device 108 is aware of subsequent packets, which, alone, are insufficient to classify the L7 application as running a YouTube® web application. In the example of operation, because the L7 state synchronization engine 110 is aware of all of the packets, by accessing an L7 application buffer stored in the L7 application buffer datastore 112, and can appropriately classify the L7 application as running a YouTube® web application. To continue the example of operation, a network policy may exist that allows YouTube® sessions and disallows unclassified http sessions. In such a scenario, the user would not have a service interruption caused by the network device 108 being aware of packets that are insufficient to classify the YouTube® session. Similarly, if the policy specifies charging for unclassified http sessions, but not for YouTube® sessions, the user would not be improperly charged for the services.

Figure 2:
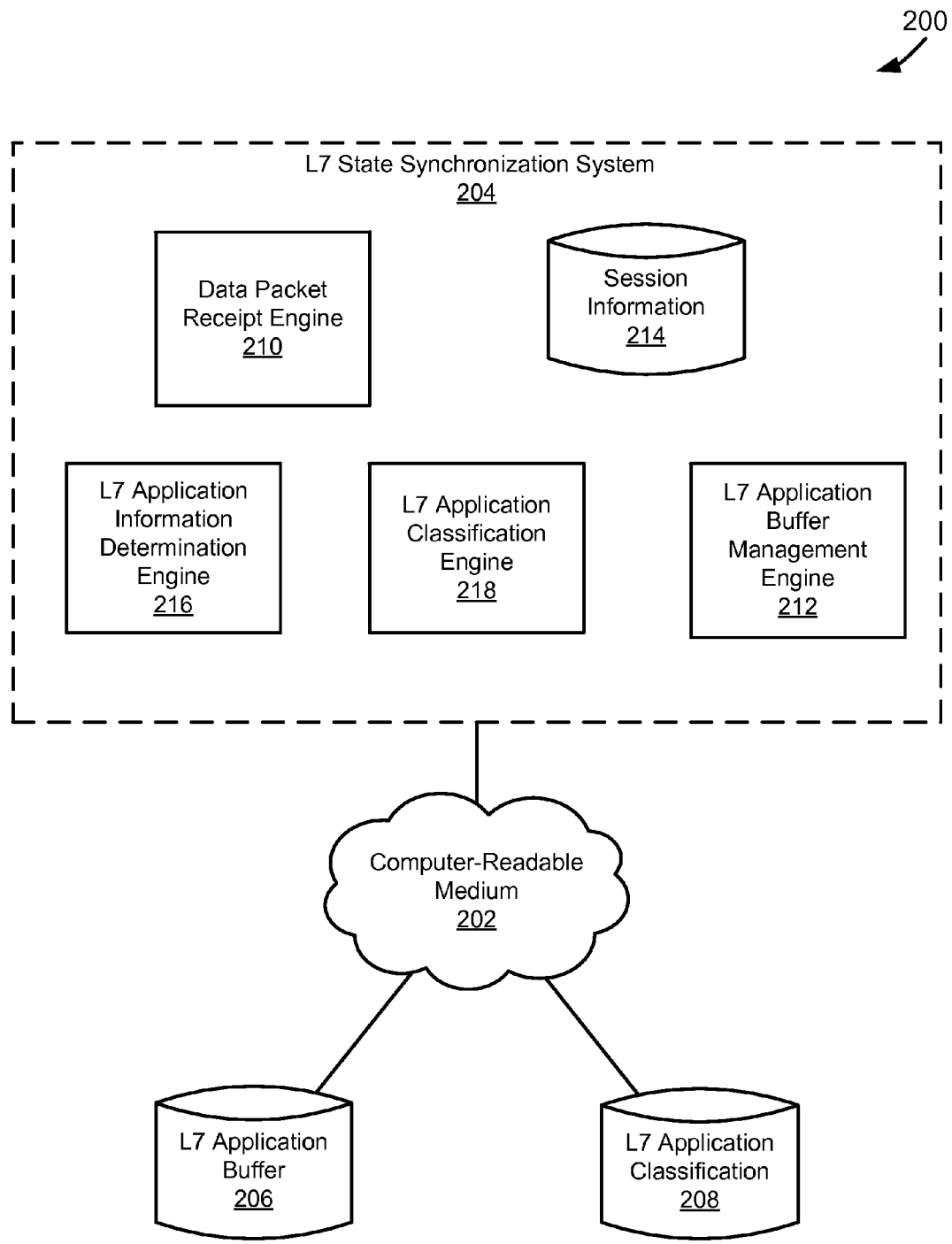
FIG. 2 depicts a diagram of an example of a system for generating an L7 application buffer and maintaining L7 state using an L7 application buffer when a client device roams between network devices that provide access to a network.

FIG. 2 depicts a diagram 200 of an example of a system for generating an L7 application buffer and maintaining L7 state using an L7 application buffer when a client device roams between network devices that provide access to a network. The example system shown in FIG. 2 includes a computer-readable medium 202, an L7 state synchronization system 204, an L7 application buffer datastore 206, and an L7 application classification datastore 208. In the example system shown in FIG. 2, the L7 state synchronization system 204, the L7 application buffer datastore 206, and the L7 application classification datastore 208 are coupled to each other through the computer-readable medium 202.

In a specific implementation, the L7 state synchronization system 204 functions according to an applicable system for maintaining, at least in part, L7 state when a client device roams between network devices, such as L7 state synchronization systems described in this paper. Depending upon implementation-specific or other considerations, the L7 state synchronization system 204 is implemented, at least in part, on network devices that a client device roams between during a session. Further depending upon implementation-specific or other considerations, the L7 state synchronization system 204 is implemented, at least in part, remote from network devices that a client device roams between during a session.

In a specific implementation, the L7 application buffer datastore 206 functions according to an applicable datastore for storing L7 application buffers, such as L7 application buffer datastores described in this paper. The L7 application buffer datastore 206 can store L7 application buffers created by the L7 state synchronization system 204. L7 application buffers stored in the L7 application buffer datastore 206, can be used by the L7 state synchronization system 204 in maintaining L7 state as a client device roams between network devices during a session.

In a specific implementation, the L7 application classification datastore 208 functions according to an applicable datastore for storing classification information, such as L7 application classification datastores described in this paper. Classification information stored in the L7 application classification datastore 208 includes a classification of an L7 application that is the subject of a session. The L7 state synchronization system 204 can generate classification information stored in the L7 application classification datastore 208. Depending upon implementation-specific or other considerations, classification information stored in the L7 application classification datastore 208 can be used to manage L7 application based features.

In the example system shown in FIG. 2, the L7 state synchronization system 204 includes a data packet receipt engine 210, an L7 application buffer management engine 212, a session information datastore 214, an L7 application information determination engine 216, and an L7 application classification engine 218. Depending upon implementation-specific or other considerations, the data packet receipt engine 210, the L7 application buffer management engine 212, the session information datastore 214, the L7 application information determination engine 216, and the L7 application classification engine 218 can be implemented in portions on various network devices, or in portions associated with various network devices. For example, the data packet receipt engine 210, the L7 application buffer management engine 212, the session information datastore 214, the L7 application information determination engine 216, and the L7 application classification engine 218 can each include a first portion that is implemented on or associated with a first network device and a second portion that is implemented on or associated with a second network device. In being implemented in portions on various network device or in portions associated with various network devices, the data packet receipt engine 210, the L7 application buffer management engine 212, the session information datastore 214, the L7 application information determination engine 216, and the L7 application classification engine 218 can be implemented as part of or associated with portions of the L7 state synchronization system 204 are associated with corresponding network devices.

In a specific implementation, the data packet receipt engine 210 functions to receive data packets transmitted to and from a client device through a network device during a session. Data packets received by the data packet receipt engine 210 can be used in executing an L7 application on a client device during a session. Depending upon implementation-specific or other considerations, the data packet receipt engine 210 can receive data packets before they are transmitted to an appropriate recipient. The data packet receipt engine 210 can be implemented on a network device and function to intercept data packets as the network device receives data packets during a session. The data packet receipt engine 210 can be implemented remote from a network device and can receive data packets sent to the L7 state synchronization system 204 by the network device during a session. The data packet receipt engine 210 can receive data packets transmitted to and from a client device as the client device roams between network devices during a session.

In a specific implementation, the L7 application buffer management engine 212 functions to manage an L7 application buffer stored in the L7 application buffer datastore 206. In managing an L7 application buffer, the L7 application buffer management engine 212 can add data packets received by the data packet receipt engine 210 during a session to an L7 application buffer for the session. Depending upon implementation-specific or other considerations, the L7 application buffer management engine 212 can clone data packets received by the data packet receipt engine 210 and add the cloned data packets to an L7 application buffer for a session. Further depending upon implementation-specific or other considerations, the L7 application buffer management engine 212 can transmit or instruct an applicable system or device, such as a network device, to transmit a data packet to an appropriate recipient after the L7 application buffer management engine 212 clones the data packet. The L7 application buffer management engine 212 can continue to add data packets received by the data packet receipt engine 210 to an L7 application buffer for a session, as a client device roams between network devices during the session.

In a specific implementation, parts of the L7 application buffer management engine 212 can be implemented on network devices that a client device roams to during a session. In being implemented on different network devices that a client device roams to during a session, portions of the L7 application buffer management engine 212 implemented on or associated with network devices that a client device roams between during a session can function to send an L7 application buffer between each other as a client device roams between network devices during a session. Portions of the L7 application buffer management implemented on or associated with network device that a client device roams between during a session can send an L7 application buffer between each other in response to a notification that a client device has roamed to a specific network device. For example, if a client device roam from a first network device to a second network device during a session, then a first portion of the L7 application buffer management system 212 can send an L7 application buffer to a second portion of the L7 application buffer management system 212. Further in the example, a second portion of the L7 application buffer management system 212 implemented on or associated with a second network device can continue to add data packets transmitted by the second network device during the session into a received L7 application buffer. An L7 application buffer can be used by a network device to which the L7 application buffer is sent to classify an L7 application that is the subject of a session, thereby maintaining L7 state as the client device roams to the network device during the session.

In a specific implementation, the L7 application buffer management engine 212 can control the size of an L7 application buffer stored in the L7 application buffer datastore 206. In controlling the size of an L7 application buffer stored, the L7 application buffer management engine 212 can continue to add data packets to the L7 application buffer to increase the size of the L7 application buffer. Depending upon implementation-specific or other considerations, the L7 application buffer management engine 212 can dynamically adjust the size of an L7 application buffer during a session. Further depending upon implementation-specific or other considerations, the L7 application buffer management engine 212 can set the size of an L7 application buffer either before or during a session based on a client device that data packets are transmitted to and from during the session. The L7 application buffer management engine 212 can control the size of an L7 application buffer stored in the L7 application buffer as a client device roams between network devices during a session.

In a specific implementation, the session information datastore 214 functions to store session information. Session information stored in the session information datastore 214 can include the amount of application information that has been or can be determined from data packets included in an L7 application buffer for a session. Session information stored in the session information datastore 214 can also include a classification level of an L7 application during a session. For example, session information can include that an L7 application is only 50% classified. In including a classification level of an L7 application during a session, session information stored in the session information datastore 214 can also include a confidence score. A confidence score, as used in this paper, indicates a confidence level that a desired classification level can be achieved from an L7 application buffer. For example a confidence score can be that there is a 50% chance that a complete classification of an L7 application can be made based on the data packets in an L7 application buffer for the L7 application. Session information can also include an identification of the type of data packets, e.g. HTTP data packets, received during a session. Session information stored in the session information datastore 214 can be continuously updated during a session as more data packets are transmitted and/or added to an L7 application buffer.

In a specific implementation, the L7 application buffer management engine 212 can control the size of an L7 application buffer based on session information stored in the session information datastore 214. For example, if session information indicates that HTTP data packets are received during a session, then the L7 application buffer management engine 212 can limit the size of an L7 application buffer to a specific size, e.g. 5 data packets. In another example, the L7 application buffer management engine 212 can continue adding data packets to an L7 application buffer until a desired classification level is achieved, as indicated by session information. In an additional example, the L7 application buffer management engine 212 can continue to add data packets to an L7 application buffer until a desired confidence score is achieved.

In a specific implementation, the L7 application information determination engine 216 functions to determine application information. The L7 application information determination engine 216 can determine application information of an L7 application that is the subject of a session from an L7 application buffer for the session stored in the L7 application buffer datastore 206. In determining application information, the L7 application information determination engine 216 can analyze data parts of data packets include in an L7 application buffer. Further in determining application information, the L7 application information determination engine 216 can analyze headers of data packets included in an L7 application buffer. The L7 application information determination engine 216 can analyze data parts of data packets, and possible headers of data packets, according to an applicable technique for analyzing data parts, and possible headers, of packets, such as DPI. In determining application information, the L7 application information determination engine 216 can determine L7 application information as data packets are added to an L7 application buffer, or after a specific number of data packets have been added to the L7 application buffer.

In a specific implementation, the L7 application information determination engine 216 functions to generate a confidence score that is included as session information stored in the session information datastore 214. The L7 application information determination engine can generate a confidence score for an L7 application buffer created during a session as application information is determined from data packets included in the L7 application buffer. Depending upon implementation-specific or other considerations, the L7 application information determination engine 216 can constantly update a confidence score for an L7 application buffer as more application information is determined from data packets added to the L7 application buffer. In generating a confidence score, the L7 application determination engine 216 can generate the confidence score based on the amount of application information and/or the type of application information determined from data packets included in an L7 application buffer.

In a specific implementation, the L7 application classification engine 218 functions to classify an L7 application using application information determined by the L7 application information determination engine 216. In classifying an L7 application, the L7 application classification engine 218 can generate classification information that includes the classifications of an L7 application determined by the L7 application classification engine 218. For example, the L7 application classification engine 218 can determine an identification of an L7 application or an identity of a web application executed in an L7 application that is a web browser. In a specific implementation, the L7 application classification engine 218 can determine a classification level that is included as part of session information stored in the session information datastore 214.

In an example of operation of the example system shown in FIG. 2, the data packet receipt engine 210 receives data packets that are transmitted by network devices, as the client device roams between network devices during a session. Additionally in the example of operation of the example system shown in FIG. 2, the L7 application buffer management engine adds data packets received by the data packet receipt engine 210 to an L7 application buffer stored in the L7 application buffer datastore 206 as a client device roams between network devices during the session. In the example of operation of the example system shown in FIG. 2, the L7 application buffer management engine 212 adds data packets to the L7 application buffer to change the size of the L7 application buffer based on session information stored in the session information datastore 214. Further in the example of operation of the example system shown in FIG. 2, the L7 application information determination engine 216 determines application information from the L7 application buffer of the session. In the example of operation of the example system shown in FIG. 2, the L7 application classification engine 218 classifies an L7 application that is the subject of the session by generating classification information stored in the L7 application classification datastore 208 that includes classifications of the L7 application.

Figure 3:
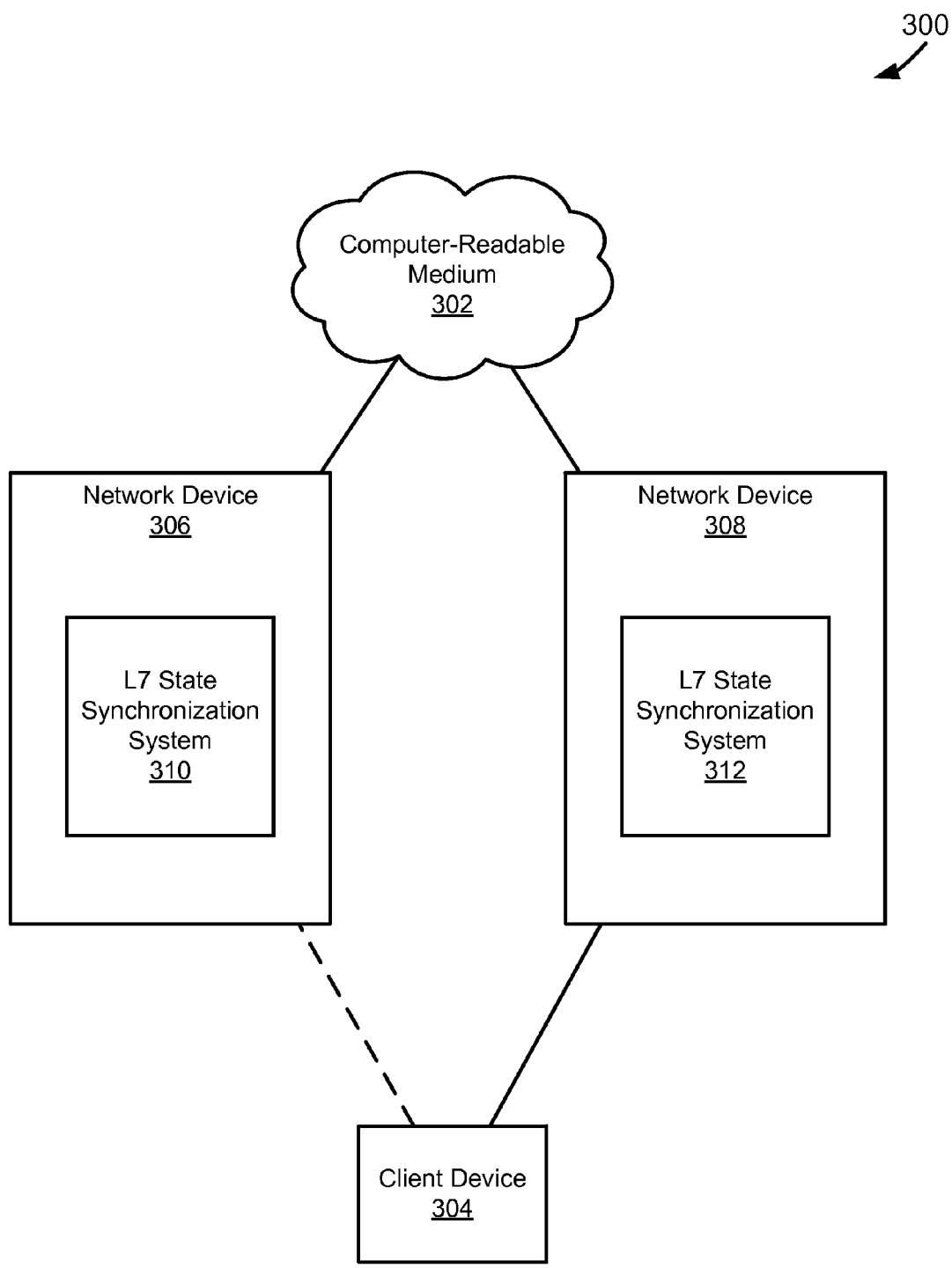
FIG. 3 depicts a diagram of an example of another system for maintaining L7 state as a client device roams between network devices during a session.

FIG. 3 depicts a diagram 300 of an example of another system for maintaining L7 state as a client device roams between network devices during a session. The example system shown in FIG. 3 includes a computer-readable medium 302, a client device 304, a network device 306, and a network device 308. The network device 306 and the network device 308 are coupled to each other through the computer-readable medium 302.

In a specific implementation, the client device 304 functions according to an applicable device for receiving data from and sending data to a network, such as the client devices described in this paper. In receiving data from and sending data to a network, the client device 304 can couple to a network device that is part of the network. In coupling to a network device that is part of a network, the client device 304 can send data to and receive data from the network through a network device. Data transmitted to and from a client device 304 during a session from a network can be used in the execution of an L7 application during the session on the client device 304.

In a specific implementation, the network devices 306 and 308 function according to an applicable device for transmitting data between a client device and a network, such as the network devices described in this paper. The network devices 306 and 308 can transmit data during a session that is used to begin and continue execution of an L7 application during the session. The network devices 306 and 308 can continue to transmit data during a session as a client device roams between the network devices 306 and 308 during the session.

In the example system shown in FIG. 3, the client device 304 is initially coupled to network device 306 during a session. In being initially coupled to the network device 306 during a session, the network device 306 can transmit data to and from the client device 304 that is used to begin or continue execution of an L7 application on the client device 304 during a session. Further in the example system shown in FIG. 3, the client device 304 decouples from the network device 306 during a session, illustrated by a dashed line, and becomes coupled to the network device 308, illustrated by a solid line, as the client device 304 roams from the network device 306 to the network device 308 during the session.

In the example system shown in FIG. 3, the network device 306 includes an L7 state synchronization system 310. Further in the example system shown in FIG. 3, the network device 308 includes an L7 state synchronization system 312. Depending upon implementation-specific or other considerations, the L7 state synchronization system 310 and the L7 state synchronization system 312 can be implemented as part of the same L7 state synchronization system and are shown as separate systems residing on the network device 306 and the network device 308 for purposes of illustration. As a result, the L7 state synchronization system 310 and the L7 state synchronization system 312 can be corresponding first and second parts of the same L7 state synchronization system. Further depending upon implementation-specific or other considerations, the L7 state synchronization system 310 and the L7 state synchronization system 312 can be implemented in the same L7 state synchronization system, a part of which is implemented remote from the network devices 308 and 308, e.g. in the cloud.

In a specific implementation, the L7 state synchronization system 310 and the L7 state synchronization system 312 function to maintain L7 state during a session when the client device 304 roams from the network device 306 to the network device 308. In maintaining L7 state, the L7 state synchronization system 310 can store data packets or copies of data packets transmitted to and from the client device 304 while the client device 304 is coupled to the network device 306 during the session. The L7 state synchronization system 310 can store data packets transmitted to and from the client device 304 during a session locally on the network device 306 or remote from the network device, e.g. in the cloud. In maintaining L7 state, the L7 state synchronization system 312 can send data packets or copies of data packets that are transmitted by the network device 308 during a session after the client device 304 roams to the network device 308 during the session, to the L7 state synchronization system 310.

In a specific implementation, the L7 state synchronization system 312 can send data packets or copies of data packets transmitted by the network device 308 during a session to the L7 state synchronization system 310 through the computer-readable medium 302. Depending upon implementation-specific or other considerations, the L7 state synchronization system 312 can send data packets or copies of data packets to the L7 state synchronization system 310 by tunneling data packets or copies of data packets to the L7 state synchronization system 310. In tunneling data packets or copies of data packets to the L7 state synchronization system 310, the L7 state synchronization system 312 can encapsulate the data packets or copies of data packets according to an applicable tunneling protocol. The L7 state synchronization system 312 can send data packets or copies of data packets to the L7 state synchronization system 310 through an encrypted tunnel, such as a secure shell tunnel. The L7 state synchronization system 310 can store data packets or copies of data packets received from the L7 state synchronization system 312 on the network device 306 or at a location remote from the network device 306, e.g. the cloud. In storing data packets and copies of data packets received from the L7 state synchronization system 312 during a session, the L7 state synchronization system 310 can store the data packets along with previously stored data packets, if any, that were stored by the L7 state synchronization system 310 when the client device 304 was coupled to the network device during the session.

In a specific implementation, the L7 state synchronization system 310 can use stored data packets, or stored copies of data packets transmitted to and from the client device 304 during a session to classify an L7 application that is the subject of the session. The L7 state synchronization system 310 can generate classification information that represents a determined classification, either complete or partial classification, of an L7 application. In classifying an L7 application, the L7 state synchronization system 310 can analyze the data parts of stored data packets or copies of data packets transmitted during a session, according to an applicable technique, such as DPI, to determine application information. The L7 state synchronization system 310 can use application information determined from data packets or copies of data packets transmitted during a session to classify an L7 application that is the subject of a session. The L7 state synchronization system 310 can classify an application to various levels of classification, e.g. partial classification. For example, the L7 state synchronization system 310 can partially classify an L7 application that is the subject of a session before the client device 304 roams to the network device 308 using the data packets or copies of data packets that were transmitted by the network device 306 during the session. As a result, of classifying an L7 application that is the subject of a session, using data packets or copies of data packets transmitted from either or both the network device 306 and the network device 308 during the session, even after the client device roams from the network device 306 to the network device 308 during the session, L7 state for the session is maintained.

In a specific implementation, the L7 state synchronization system 310 can send generated classification information representing a classification of an L7 application that is the subject of a session to the L7 state synchronization system 312 during the session. Specifically, the L7 state synchronization system 310 can send generated classification information representing a classification of an L7 application that is the subject of a session to the L7 state synchronization system 312 during the session, while the client device is still coupled to the network device 308. The L7 state synchronization system 312 can use classification information received from the L7 state synchronization system 310 to manage L7 application based features for an L7 application that is the subject of a session. For example, the L7 state synchronization system 312 can terminate a session if it is determined that the L7 application that is the subject of the session is a prohibited application.

In the example system shown in FIG. 3, the client device 304 is shown to roam between the network device 306 and the network device 308, by decoupling from the network device 306 and coupling to the network device 308. However, in an additional example, the client device 304 can roam again to decouple from the network device 308 and become coupled, once again, to the network device 306. In the additional example, the L7 state synchronization system 312 can continues sending data packets or copies of data packets that are transmitted during a session while the client device 304 is coupled to the network device 308 to the L7 state synchronization system 310. Once the client device 304 recouples to the network device 306, the L7 state synchronization system 310 can store data packets or copies of data packets transmitted during a session. The data packets or copies of data packets stored by the L7 state synchronization system 310 including ones stored after the client device 304 recouples to the network device 306 during a session can be used along with the data packets or copies of data packets sent to the L7 state synchronization system 310 by the L7 state synchronization system 312 to classify an L7 application that is the subject of the session.

In an example of operation of the example system shown in FIG. 3, the client device originally couples to the network device 306 during a session. Further in the example of operation, the L7 state synchronization system 310 stores data packets or copies of data packets transmitted during the session by the network device 306 on the network device 306. In the example of operation of the example system shown in FIG. 3, the client device 304 decouples from the network device 306 and couples to the network device 308 during the session. Additionally, in the example of operation of the example system shown in FIG. 3, the L7 state synchronization system 312 sends data packets or copies of data packets transmitted by the network device 308 during the session when the client device 304 is coupled to the network device 308 to the L7 state synchronization system 310. In the example of operation of the example system shown in FIG. 3, the L7 state synchronization system 310 stores the data packets or the copies of data packets received from the L7 state synchronization system on the network device 306. Also in the example of operation of the example system shown in FIG. 3, data packets or copies of data packets stored locally on the network device 306 are used to classify an L7 application that is the subject of the session. In the example of operation of the example system shown in FIG. 3, in using data packets or copies of data packets transmitted by the network devices 306 and 308 as the client device 304 roams between the network device 306 and 308 during the session, L7 state is maintained.

Figure 4:
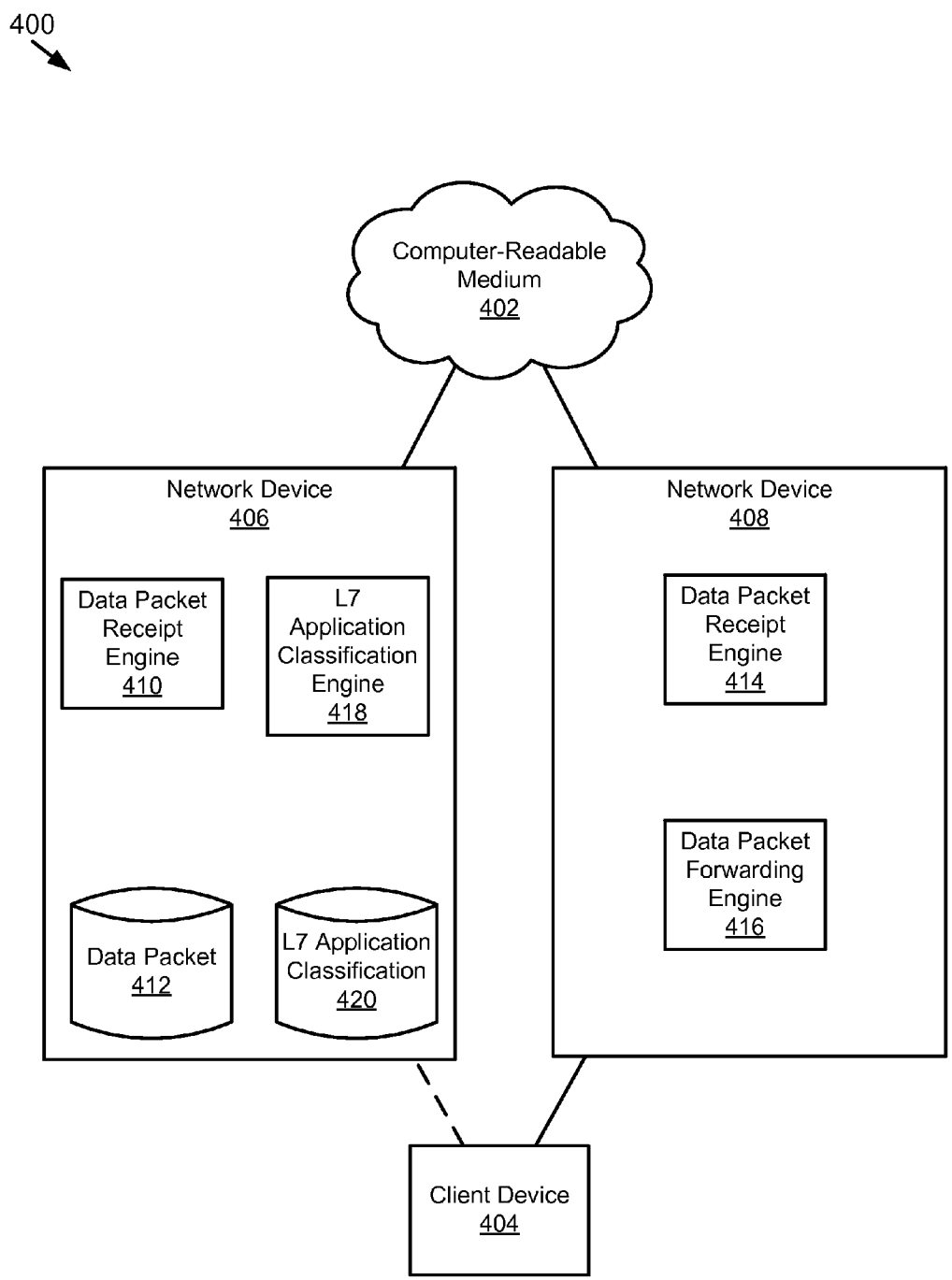
FIG. 4 depicts a diagram of an example of a system for classifying an L7 application that is the subject of a session for maintaining L7 state as a client device roams between network devices during the session.

FIG. 4 depicts a diagram 400 of an example of a system for classifying an L7 application that is the subject of a session for maintaining L7 state as a client device roams between network devices during the session. The example system shown in FIG. 4 includes a computer-readable medium 402, a client device 404, a network device 406, and a network device 408. In the example system shown in FIG. 4, the network devices 406 and 408 are coupled to each other through the computer-readable medium 402.

In a specific implementation, the client device 404 functions according to an applicable device for receiving data from and sending data to a network, such as the client devices described in this paper. In receiving data from and sending data to a network, the client device 404 can couple to a network device that is part of the network. In coupling to a network device that is part of a network, the client device 404 can send data to and receive data from the network through the network device. Data transmitted to and from a client device 404 during a session from a network can be used in the execution of an L7 application during the session on the client device 404.

In a specific implementation, the network devices 406 and 408 function according to an applicable device for transmitting data between a client device and a network, such as the network devices described in this paper. The network devices 406 and 408 can transmit data during a session that is used to begin and continue execution of an L7 application during the session. The network devices 406 and 408 can function to transmit data during a session as a client device roams between the network devices 406 and 408 during the session.

In the example system shown in FIG. 4, the client device 404 is initially coupled to network device 306 during a session. In being initially coupled to the network device 406 during a session, the network device 406 can transmit data to and from the client device 404 that is used to begin execution of an L7 application on the client device 404 during a session. Further in the example system shown in FIG. 4, the client device 404 decouples from the network device 406 during a session, illustrated by a dashed line, and becomes coupled to the network device 408, illustrated by a solid line, as the client device 404 roams from the network device 406 to the network device 408 during the session.

In the example system shown in FIG. 4, the network device 406 includes a data receipt engine 410 and a data packet datastore 412. The data packet receipt engine 410 and the data packet datastore 412 can be implemented as part of an applicable system used, at least in part, maintaining L7 state during a session, such as the L7 state synchronization systems described in this paper. Additionally, while the data packet receipt engine 410 and the data packet datastore 412 are illustrated in the example system of FIG. 4 as being part of the network device 406, in various implementations, all or portions of the data packet receipt engine 410 and the data packet datastore 412 can be implemented remote from the network device 406, e.g. in the cloud.

In a specific implementation, the data packet receipt engine 410 functions to receive data packets transmitted during a session by the network device 406 to and from the client device 404 while the client device 404 is coupled to the network device 406. Depending upon implementation-specific or other considerations, in receiving data packets during a session, the data packet receipt engine 410 can receive data packets before they are transmitted by the network device 406. Further depending upon implementation-specific or other considerations, in receiving data packets during a session, the data packet receipt engine 410 can receive data packets for transmission during a session by the network device, copy the data packets, and instruct the network device 406 to transmit the data packets to appropriate recipients after they have been copied by the data packet receipt engine 410. The data packet receipt engine 410 can store received data packets or copies of received data packets in the data packet datastore 412.

In the example system shown in FIG. 4, the network device 408 includes a data packet receipt engine 414 and a data packet forwarding engine 416. The data packet receipt engine 414 and the data packet forwarding engine 416 can be implemented as part of an applicable system used, at least in part, maintaining L7 state during a session, such as the L7 state synchronization systems described in this paper. Additionally, while the data packet receipt engine 414 and the data packet forwarding engine 416 are illustrated in the example system of FIG. 4 as being part of the network device 408, in various implementations, all or parts of the data packet receipt engine 414 and the data packet forward engine 416 can be implemented remote from the network device 408, e.g. in the cloud.

In a specific implementation, the data packet receipt engine 414, in being implemented in conjunction with the network device 408, functions to receive data packets transmitted during a session by the network device 408 to and from the client device 404 while the client device 404 is coupled to the network device 408 during the session. Depending upon implementation-specific or other considerations, in receiving data packets during a session, the data packet receipt engine 414 can receive data packets before they are transmitted by the network device 408. Further depending upon implementation-specific or other considerations, in receiving data packets during a session, the data packet receipt engine 414 can receive data packets for transmission during a session by the network device, copy the data packets, and instruct the network device 408 to transmit the data packets to appropriate recipients after they have been copied by the data packet receipt engine 414.

In a specific implementation, the data packet forwarding engine 416 functions to transmit data packets or copies of data packets received by the data packet receipt engine 414 to the network device 406. The data packet forwarding engine 416 can send data packets or copies of data packets through the computer-readable medium to the network device 406. The data packet forwarding engine 416 can send data packets or copies of data packets through a tunnel according to an applicable tunneling protocol, e.g. a secure shell protocol, to the network device 406. In sending data packets or copies of data packets, the data packet forwarding engine 416 can encapsulate data packets or copies of data packets using a networking protocol according to an applicable tunneling protocol, e.g. a secure shell protocol.

In a specific implementation, the data packet receipt engine 410, implemented in conjunction with the network device 406, can receive data packets or copies of data packets sent by the data packet receipt engine 414 implemented in conjunction with the network device 408. The data packet receipt engine 410 can receive data packets or copies of data packets from the data packet receipt engine 414 that were received while the client device 404 is coupled to the network device 408. Depending upon implementation-specific or other considerations, the data packet receipt engine 410 can receive data packets or copies of data packets form the data packet receipt engine 414 through a network tunnel. The data packet receipt engine 410 can store data packets or copies of data packets received from the data packet receipt engine 414 in the data packet datastore 412.

In the example system shown in FIG. 4, the client device 404 is shown to be initially coupled to the network device 406 and then decoupled from the network device 406 and couple to the network device 408 as the client device 404 roams. However, in various implementations, the client device 404 can decoupled from the network device 408 and recouple to the network device 406 in roaming during a session. In recoupling with the network device 406, the data packet receipt engine 410 can receive data packets that are transmitted to appropriate recipients by the network device 406 during a session once the client device 404 recouples to the network device 406. The data packet receipt engine 410 can stored data packets are copies of data packets transmitted to appropriate recipients, once the client device 404 recouples to the network device 406 during a session in the data packet datastore 412.

In the example system shown in FIG. 4, the network device 406 includes an L7 application classification engine 418 and an L7 application classification datastore 420. In a specific implementation, the L7 application classification engine 418 functions to classify an L7 application that is the subject of a session in which the client device 404 roams between multiple network devices, e.g. network device 406 and network device 408. In classifying an L7 application that is the subject of a session in which the client device 404 roams between multiple network devices, L7 state can be maintained during the session. Depending upon implementation-specific or other considerations, the L7 application classification engine 418 can classify an L7 application to a desired classification level, e.g. partial classification or complete classification. In classifying an L7 application, the L7 application classification engine 418 can use data packets or copies of data packets stored in the data packet datastore 412. Data packets or copies of data packets stored in the data packet datastore 412 can be received by either the data packet receipt engine 410 or the data packet receipt engine 414, while the network device 404 is coupled to either or both the network device 406 and the network device 408 during a session. Depending upon implementation-specific or other considerations, the L7 application classification engine 418 can classify an L7 application after a specific number of data packets or copies of data packets for a session of which the L7 application is a subject, are stored in the data packet datastore 412. Further depending upon implementation-specific or other considerations, the L7 application classification engine 418 can continue to classify an L7 application as data packets or copies of data packets for a session, of which the L7 application is a subject, are stored in the data packet datastore 412.

In a specific implementation, in classifying an L7 application, the L7 application classification engine 418 can determine application information from the data packets and/or copies of data packets for a session, stored in the data packet datastore 412. The L7 application classification engine 418 can determine application information from data packets or copies of data packets received by the data packet receipt engine 410 implemented in conjunction with the network device 406 from the data packet receipt engine 414 implemented in conjunction with the network device 408. The L7 application engine 418 can determine application information from data packets or copies of data packets by analyzing the data parts of data packets or copies of data packets, and possibly headers of data packets or copies of data packets. In analyzing the data parts, and possibly headers, of data packets and copies of data packets, the L7 application classification engine 418 can use an applicable technique for analyzing data parts, and possibly headers, of data packets or copies of data packets such as DPI. The L7 application classification engine 418 can use the application information to classify an L7 application.

In a specific implementation, the L7 application classification engine 418 can store classification information that specifies application classification for an L7 application that is the subject of a session. Classification information stored in the L7 application classification datastore 410 can be updated as the L7 application classification engine continues to classify an L7 application during a session, e.g. as more data packets or copies of data packets are stored in the data packet datastore 412 in the session. Depending upon implementation-specific or other considerations, the L7 application engine 418 can send classification information to the network device 408. For example, the L7 application classification engine 418 can send classification to the network device 408, while the client device 404 is coupled to the network device 408, for maintaining state during a session.

In an example of operation of the example system shown in FIG. 4, the data packet receipt engine 410 receives data packets of a session as the client device 404 is coupled to the network device 406 during the session. In the example of operation of the example system shown in FIG. 4, the data packet receipt engine 410 stores the received data packets or copies of data packets during the session in the data packet datastore 412. Further in the example of operation of the example system shown in FIG. 4, the data packet receipt engine 414 receives data packets of copies of data packets of the session as the client device 404 is coupled to the network device 408 during session. In the example of operation of the example system shown in FIG. 4, the data packet receipt engine 414 receives data packets of a session as the client device 404 is coupled to the network device 408 during the session. Additionally in the example of operation of the example system shown in FIG. 4, the data packet forwarding engine 416 sends the data packets or copies of the data packets received by the data packet receipt engine 414 to the network device 406. In the example of operation of the example system shown in FIG. 4, the data packet receipt engine 410 receives the data packets or the copies of the data packets sent by the data packet receipt engine 414 to the network device 404 and stores the data packets or the copies of data packets in the data packet datastore 412. Further in the example of operation of the example system shown in FIG. 4, the L7 application classification engine 418 classifies the L7 application that is the subject of the session, stores classification information specifying the classification of the L7 application in the L7 application classification datastore 420, and sends the classification information to the network device 408 while the client device 404 is coupled to the network device 408 during the session.

Figure 5:
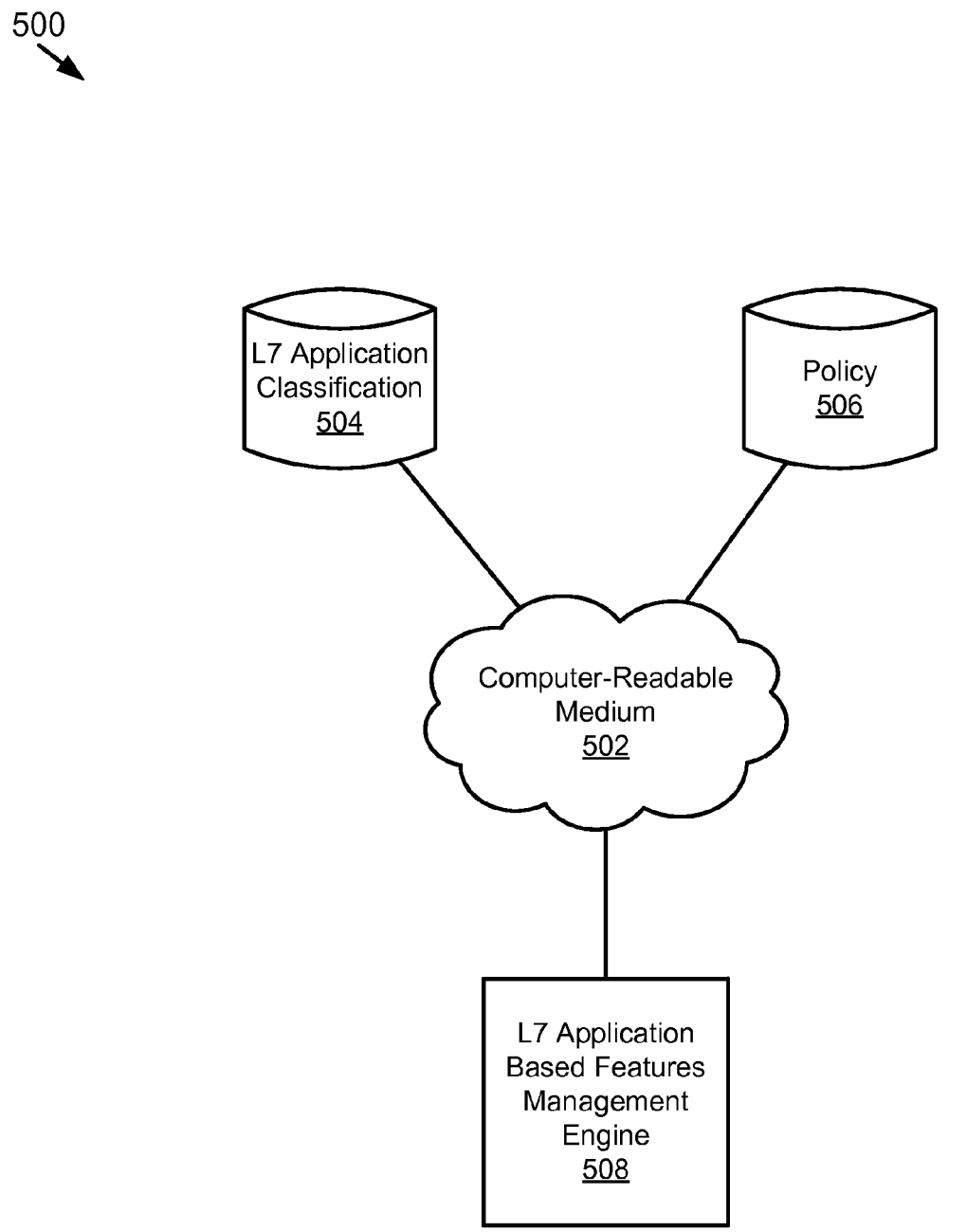
FIG. 5 depicts a diagram of an example of a system for managing L7 application based features.

FIG. 5 depicts a diagram 500 of an example of a system for managing L7 application based features. The example system shown in FIG. 5 includes a computer-readable medium 502, an L7 application classification datastore 504, a policy datastore 506, and an L7 application based features management engine 508. In the example system shown in FIG. 5, the L7 application classification datastore 504, the policy datastore 506, and the L7 application based features management engine 508 are coupled to each other through the computer readable-medium 502.

In a specific implementation, the L7 application classification datastore 504 functions according to an applicable datastore to store classification information identifying classifications of an L7 application that is the subject of a session, such as the L7 application classification datastore described in this paper. Classification information stored in the L7 application classification datastore 504 can be used in managing L7 application based features. Depending upon implementation-specific or other considerations, the L7 application classification datastore 504 can be implemented, at least in part, on a network device that functions to transmit data during a session. Further depending upon implementation-specific or other considerations, the L7 application classification datastore 504 can be implemented, at least in part, remote from a network device that functions to transmit data during a session, e.g. in the cloud.

In a specific implementation, the policy datastore 506 functions to store policy information. Policy information stored in the policy datastore can be used in managing L7 application based features. Policy information can be created by an applicable entity with authorization to make policies, e.g. a network administrator. Policy information can include network policies or device policies. Network policies can be specific to a network through which a client device is coupled. For example, network policies can specify what kinds of L7 applications can be accessed and how they can be accessed across client devices coupled to a network. Device policies can be specific to devices within a network. For example, device policies can specify what kinds of L7 applications can be accessed and how they can be accessed by specific client devices, or client devices coupled to specific network devices within the network. Depending upon implementation-specific or other considerations, the policy datastore 506 can be implemented, at least in part, on a network device that functions to transmit data during a session. Further depending upon implementation-specific or other considerations, the policy datastore 506 can be implemented, at least in part, remote from a network device that functions to transmit data during a session, e.g. in the cloud.

In a specific implementation, the L7 application based features management engine 508 functions to manage L7 application based features during a session. The L7 application based features management engine 508 can be implemented as part of or associated with a network device that a client device is coupled to during a session. For example, the L7 application based features management engine 508 can be implemented as part of a first or second network device that a client device couples to during a session or remote from a first or second network device that a client device couples to during the session, e.g. in the cloud. Depending upon implementation-specific or other considerations, the L7 application based features management engine 506 can be implemented, at least in part, on a network device that functions to transmit data during a session. Further depending upon implementation-specific or other considerations, the L7 application based features management engine 508 can be implemented, at least in part, remote from a network device that functions to transmit data during a session, e.g. in the cloud.

In a specific implementation, in managing L7 application based features, the L7 application based features management engine 508 can utilize classification information stored in the L7 application classification datastore 504 and policy information stored in the policy datastore 506. Specifically, the L7 application based features management engine 508 can manage L7 application based features according to a classification of an L7 application that is the subject of a session and policies, either or both network policies and device policies. For example, if classification information identifies an L7 application that is the subject of a session as Apple FACETIME®, and network policies or device policies specify that Apple FACETIME® is forbidden, then the L7 application based features management engine 508 can manage L7 application based features, by terminating the session and/or informing a user of a client device that the L7 application is forbidden. Additionally, the L7 application based features management engine can use classification information to determine a priority level of an application and manage L7 application based features, e.g. traffic shaping, according to the determined priority level. For example, if application classification information identifies an L7 application that is the subject of a session as Apple FACETIME®, and network policies or device policies specify that Apple FACETIME® is a low priority L7 application, then the L7 application based features management engine 508 can delay transmission of data used in the session that is Apple FACETIME® to allow transmission of data for other sessions, the subjects of which are higher priority L7 applications.

In an example of operation of the example system shown in FIG. 5, the L7 application classification datastore 504 stores classification information that includes classifications of an L7 application that is the subject of a session. In the example of operation of the example system shown in FIG. 5, the policy datastore 506 stores policies of a network and devices that are in the network. Further in the example of operation of the example system shown in FIG. 5, the L7 application based features management engine 508 manages L7 application based features using the classification information and the policies of the network and the devices that are in the network.

Figure 6:
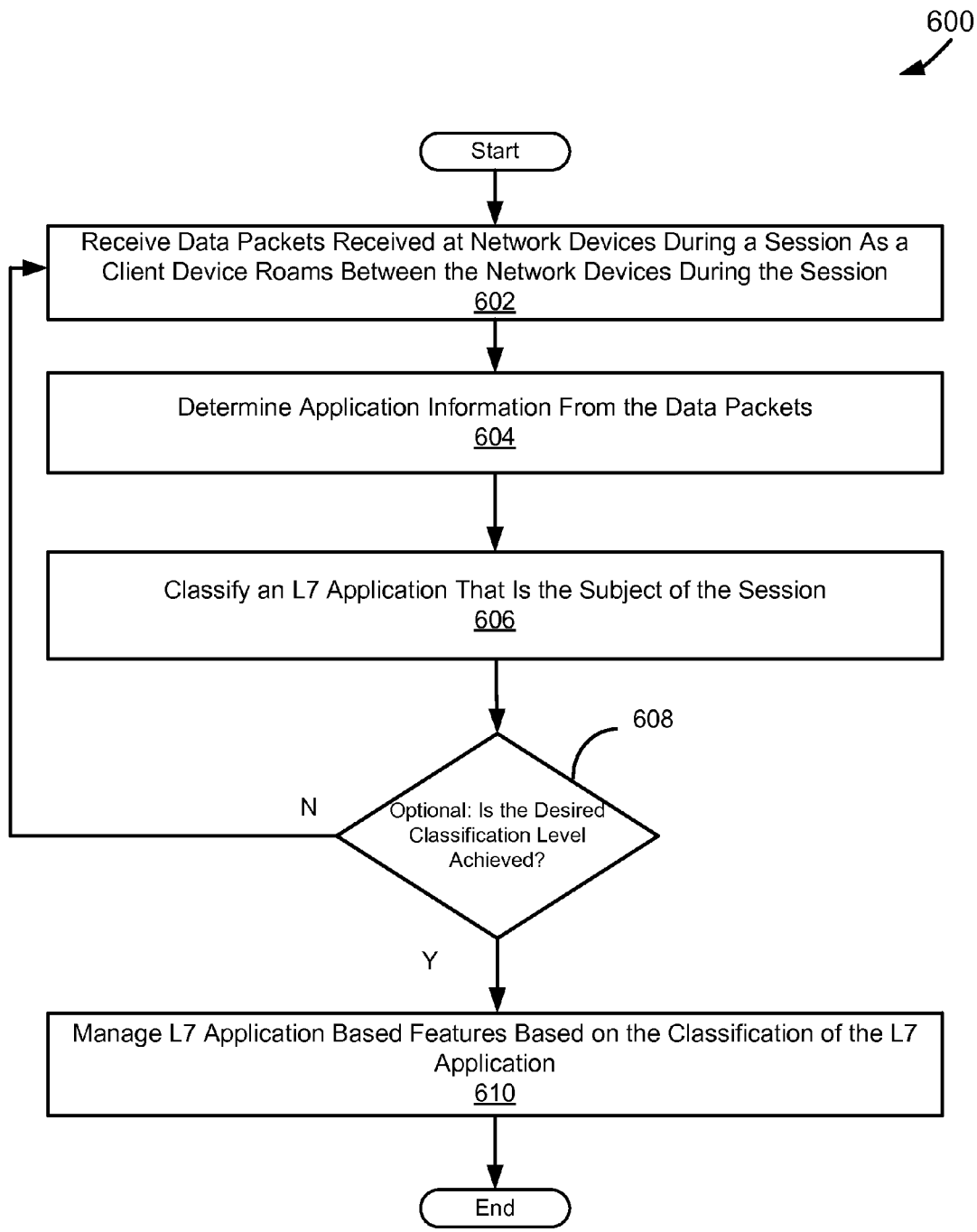
FIG. 6 depicts a flowchart of an example of a method for managing L7 application based features while maintaining L7 state as a client device roams between network devices.

FIG. 6 depicts a flowchart 600 of an example of a method for managing L7 application based features while maintaining L7 state as a client device roams between network devices. The flowchart 600 begins at module 602, where data packets or copies of data packets received by network devices during a session as a client device roams between the network devices during the session are received. Depending upon implementation-specific or other considerations, data packets or copies of data packets can be received at a first network device from a second network device that a client device roams to during the session after being coupled to the first network device. Further depending upon implementation-specific or other considerations, data packets or copies of data packets can be received at a second network device from a first network device after the client device is no longer coupled to the first network device and roams to become coupled to the second network device.

The flowchart 600 continues to module 604, where application information of an L7 application that is the subject of the session is determined from the data packets or the copies of the data packets. Application information can be determined from data packets or copies of data packets received by both a first network device and a second network device that the client device roams between during a session. Application information can be determined by analyzing data parts, and possibly headers, of data packets or copies of data packets transmitted during a session. In analyzing data parts, and possibly headers, of the data packets or copies of data packets an applicable technique can be used to determine application information, e.g. DPI.

The flowchart 600 continues to module 606, where an L7 application that is the subject of the session is classified using application information determined at module 604. For example, an L7 application can be classified as an Apple FACETIME® application using the application information determined at module 604. In another example, an L7 application can be classified as a web browser executing YouTube® based on application information determined at module 604. In various implementations, in classifying an application based on application information determined based on data packets receive by the network devices as a client device roams between the network devices during a session, L7 state is maintained during the session.

The flowchart 600 optionally continues to decision point 608, where it is determined whether the desired classification level of the L7 application is achieved at module 606. Levels of classification can include the degree to which an L7 application is classified, e.g. a partial degree to which an L7 application is classified. A desired classification level can include whether the L7 application is classified enough to allow L7 application based features associated with the execution of the L7 application can be managed using the classification of the L7 application determined at module 606. If it is determined at decision point 608, that a desired classification level is not achieved, then the flowchart can continue to module 602 where data packets received by the network devices during the session are received and are used to further classify the L7 application to a desired classification level.

If it is determined at optional decision point 608 that the desired classification level is achieved, then the flowchart 600 continues to module 610 where L7 application based features are managed based on the classification of the L7 application. At module 610, policies, including network and/or device policies, can be used to manage L7 application based features using a classification of the L7 application. For example, if the classification of the L7 application indicates that the L7 application is an Apple FACETIME® application, and policies indicate that Apple FACETIME® is forbidden on the network, then in managing L7 application based features of the L7 application, the session for the L7 application can be terminated.

Figure 7:
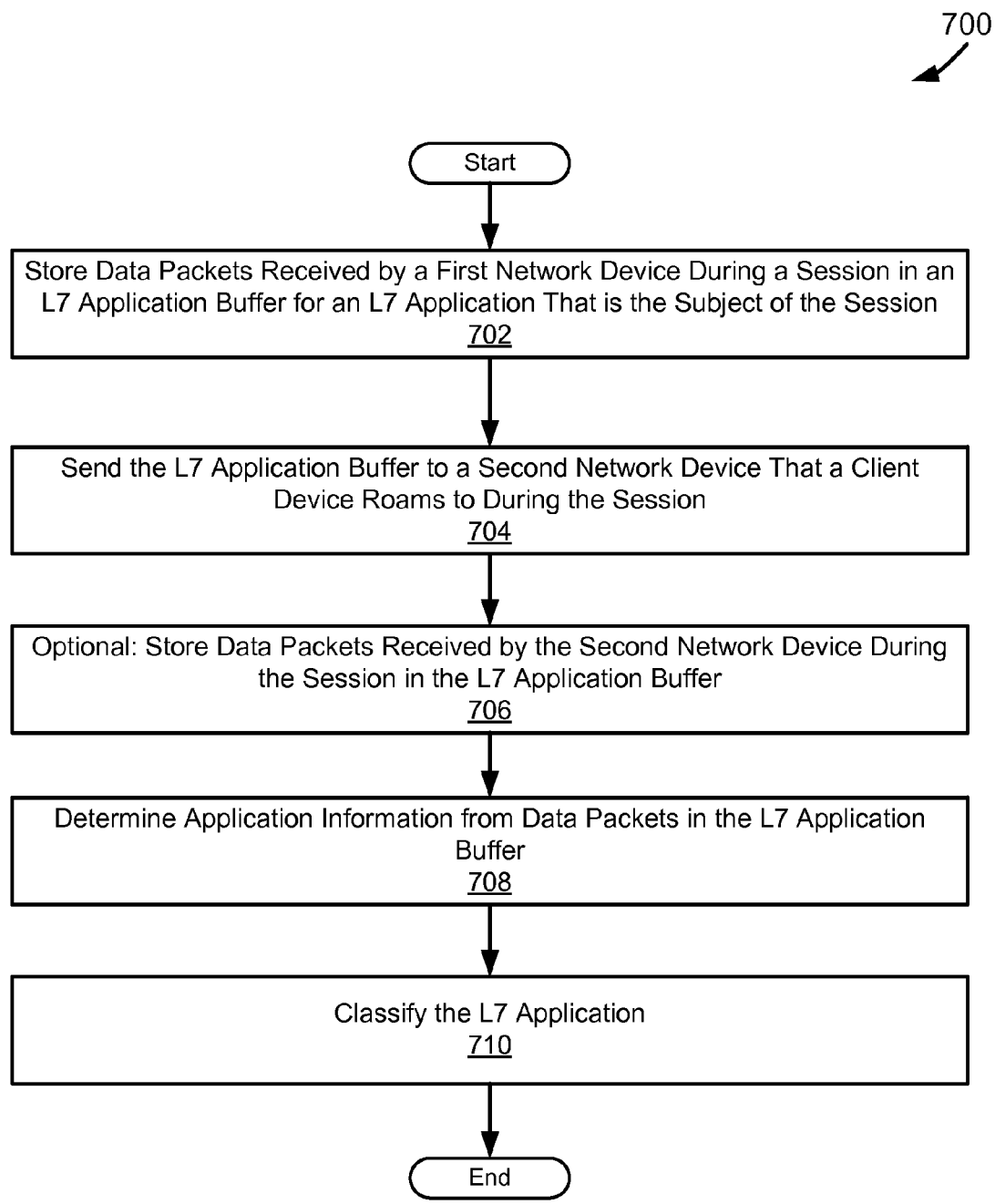
FIG. 7 depicts a flowchart of an example of a method for classifying an L7 application for maintaining L7 state as a client device roams during a session.

FIG. 7 depicts a flowchart 700 of an example of a method for classifying an L7 application for maintaining L7 state as a client device roams during a session. The flowchart 700 begins at module 702, where data packets or copies of data packets received by a first network device during a session are stored in an L7 application buffer. Data packets or copies of data packets received by a first network device during a session can be used to begin or continue execution of an L7 application on a client device during the session. An L7 application buffer, in which data packets or copies of data packets received by the first network device are stored, can be implemented, at least in part, on the first network device or remote from the first network device, e.g. in the cloud. The data packets or copies of data packets can be stored in an L7 application buffer by a portion of an L7 state synchronization system that is implemented on the first network device.

The flowchart 700 continues to module 704, where the L7 application buffer is sent to a second network device that a client device roams to during the session. Depending upon implementation-specific or other considerations, in sending the L7 application buffer to a second network device, a first portion of an L7 state synchronization system implemented on the first network device can send the L7 application buffer to a second portion of the L7 state synchronization system implemented on the second network device.

The flowchart 700 continues to module 706, where optionally, data packets or copies of data packets received by the second network device during the session are stored in the L7 application buffer. Data packets received by the second network device during the session can be used to begin or continue execution of the L7 application that is the subject of the session on the client device. Data packets received by the second network device can be received after the client device decouples from the first network device and roams to become coupled to the second network device.

The flowchart 700 continues to module 708, where application information is determined form data packets or copies of data packets in the L7 application buffer. Application information can be determined from the data packets or copies of data packets received by a first network device during a session. Application information can also be determined from data packets or copies of data packets received by a second network device during a session. Application information can be determined by analyzing data parts, and possibly headers, of data packets or copies of data packets received during a session. In analyzing data parts, and possibly headers, of the data packets or copies of data packets an applicable technique can be used to determine application information, e.g. DPI. Application information can be determined from the L7 application buffer using an L7 state synchronization system 312 that is associated with or a part of which is implemented on the second network device.

The flowchart 700 continues to module 710, where the L7 application is classified based on the application information determined at module 708. Depending upon implementation-specific or other considerations, the application information determined at module 708 is enough to partially classify the L7 application, such that the L7 application is partially classified at module 710. Further depending upon implementation-specific or other considerations, the application information determined at module 708 is enough to completely classify the L7 application, such that the L7 application is completely classified at module 710. In various implementations, in using data packets received by both the first network device and the second network device as the client device roams between the first and second network devices during the session, L7 state is maintained during the session.

Figure 8:
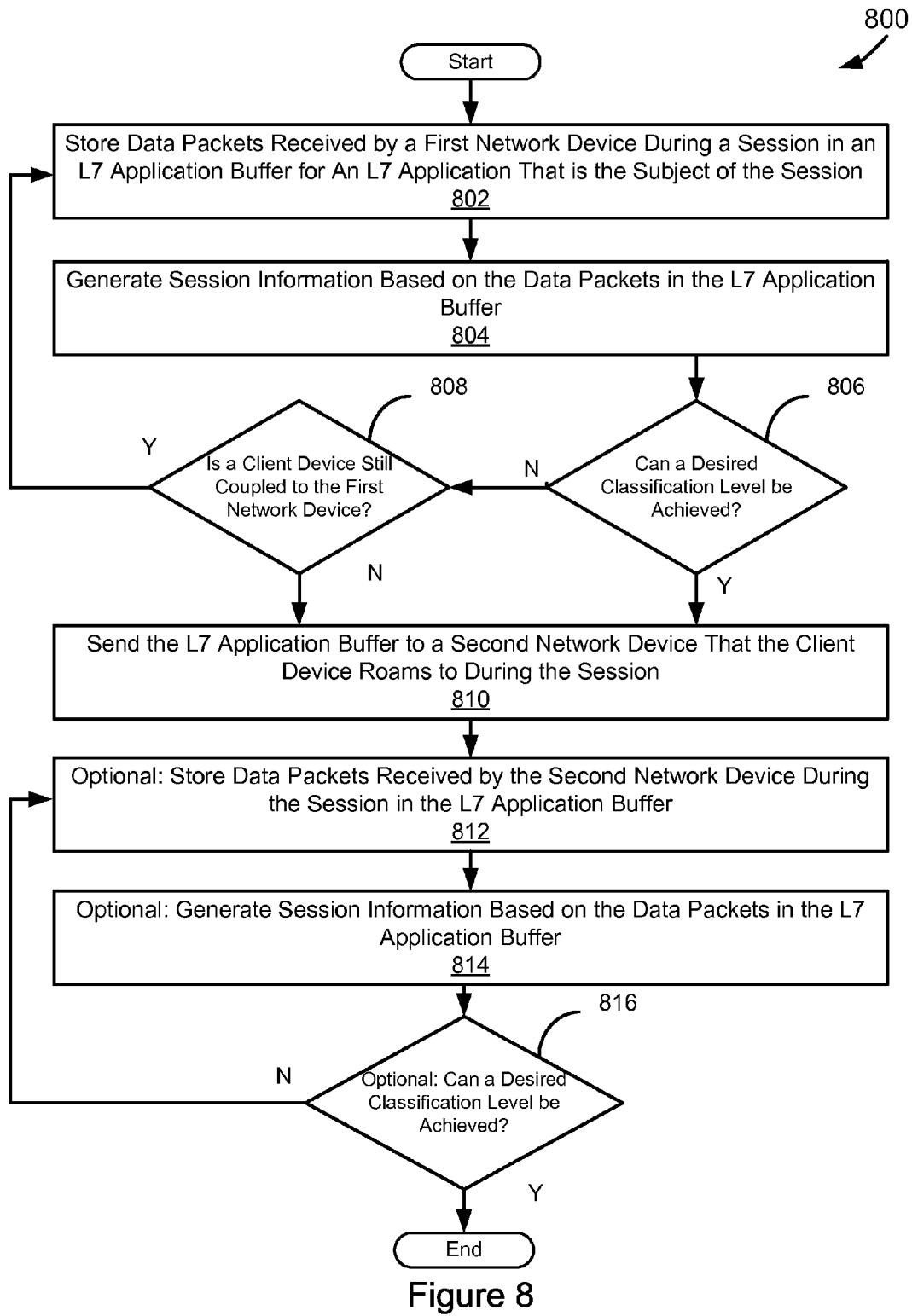
FIG. 8 depicts a flowchart of an example of a method for dynamically adjusting an L7 application buffer for maintaining L7 state as a client device roams between network devices.

FIG. 8 depicts a flowchart 800 of an example of a method for dynamically adjusting an L7 application buffer for maintaining L7 state as a client device roams between network devices. The flowchart 800 begins at module 802, where data packets or copies of data packets received by a first network device during a session are stored in an L7 application buffer. The data packets received by the first network device can be used to begin or continue execution of an L7 application that is the subject of the session. An L7 application buffer, in which data packets or copies of data packets received by the first network device are stored, can be implemented, at least in part, on the first network device or remote from the first network device, e.g. in the cloud. The data packets or copies of data packets can be stored in an L7 application buffer by a portion of an L7 state synchronization system that is implemented on the first network device.

The flowchart 800 continues to module 804 where session information is generated based on the data packets or the copies of data packets in the L7 application buffer. Session information can be generated at module 804 based on the data packets or the copies of data packets in the L7 application buffer by an L7 state synchronization system or a first portions of an L7 state synchronization system. An L7 state synchronization system or a first portion of an L7 state synchronization system that generates session information at module 804 can be implemented, at least in part, on the first network device. An L7 state synchronization system or a portion of an L7 state synchronization system that generates session information at module 804 can be associated with the first network device and be implemented, at least in part, remote from the first network device, e.g. in the cloud. Session information can include an amount of application information that can be determined from the data packets or copies of data packets included in the L7 application buffer, a classification level that can be determined from the data packets or the copies of data packets included in the L7 application buffer, and a confidence score indicating the chance that a desired classification level can be determined form the data packets or the copies of data packets included in the L7 application buffer.

The flowchart 800 continues to decision point 806 where it is determined whether a desired classification level can be achieved based on the data packets or the copies of data packets included in the L7 application buffer. At decision point 806, session information generated at module 804 can be used to determine whether a desired classification level can be achieved. For example, if the session information includes a confidence score that indicates that there is a 90% chance that the desired classification level can be achieved, then it can be determined at decision point 806 that the desired classification level can be achieved. Similarly, if the session information includes a confidence score that indicates that there is a 10% change that the desired classification level can be achieved, then it can be determined at decision point 806 that the desired classification level cannot be achieved. In another example, if the session information indicates a classification level that can be achieved, and the classification level is greater than or equal to a desired classification level, then it can be determined at decision point 806 that a desired classification level can be achieved.

If it is determined at decision point 806 that the desired classification level cannot be achieved, then the flowchart 800 continues to decision point 808. At decision point 808 it is determined whether a client device that is part of the session for executing an L7 application that is the subject of a session on the client device is still coupled to the first network device. If it is determined at decision point 808 that the client device is still coupled to the first network device, then the flowchart 800 continues to module 802, where more data packets received by the first network device are added to the L7 application buffer, thereby dynamically changing the size of the L7 application buffer.

If it is determined at decision point 806 that the desired classification level can be achieved, then the flowchart continues to module 810. Similarly, if it is determined at decision point 808 that the client device is no longer coupled to the first network device but is instead coupled to a second network device, then the flowchart continues to module 810. At module 810 the L7 application buffer is sent to the second network device that the client device roams to during the session. An L7 application buffer can be received at the second network device by an L7 state synchronization system or a second portion of an L7 state synchronization system implemented, at least in part, on the second network device. An L7 application buffer can be received at the second network device by an L7 state synchronization system or a second portion of an L7 state synchronization system associated with the second network device that can be implemented, at least in part, remote from the first network device, e.g. in the cloud.

The flowchart 800 continues to module 812, where optionally, data packet or copies of data packets received by the second network device during the session are stored in the L7 application buffer. Data packets received by the second network device during the session can be used to begin or continue execution of the L7 application that is the subject of the session on the client device. Data packets received by the second network device can be received after the client device decouples from the first network device and roams to become coupled to the second network device. Depending upon-implementation specific or other considerations, data packets or copies of data packets received by the network device can be added to the L7 application buffer if it is determined that the desired classification level cannot be achieved and that the client device is no longer coupled to the first network device.

The flowchart 800 continues to module 814, where optionally, session information is generated based on the data packets or copies of data packets in the L7 application buffer. Session information can be generated at module 814 based on data packets or copies of data packets received by the first network device and the second network device and added to the L7 application buffer during the session. Session information can be generated at module 814 based on the data packets or the copies of data packets in the L7 application buffer by an L7 state synchronization system or a second portion of an L7 state synchronization system. An L7 state synchronization system or a second portion of an L7 state synchronization system that generates session information at module 814 can be implemented, at least in part, on the second network device. An L7 state synchronization system or a second portion of an L7 state synchronization system that generates session information at module 814 can be associated with the second network device and be implemented, at least in part, remote from the second network device, e.g. in the cloud.

The flowchart continues to decision point 816, where it is optionally determined whether a desired classification level can be achieved based on the data packets or copies of data packets included in the L7 application buffer. If at decision point 816, it is determined that a desired classification level cannot be achieved, then the flowchart 800 continues based to module 812, where data packets received by the second network device during the session are added to the L7 application buffer, thereby dynamically changing the size of the L7 application buffer. In the example flowchart 800 shown in FIG. 8, module 812, module 814, and decision point 816 are optional as the L7 application buffer may already have the required data packets or copies of data packets to classify the L7 application to a desired classification level and therefore not need to have additional packets to it that are received at the second network device for use in classifying the L7 application.

Figure 9:
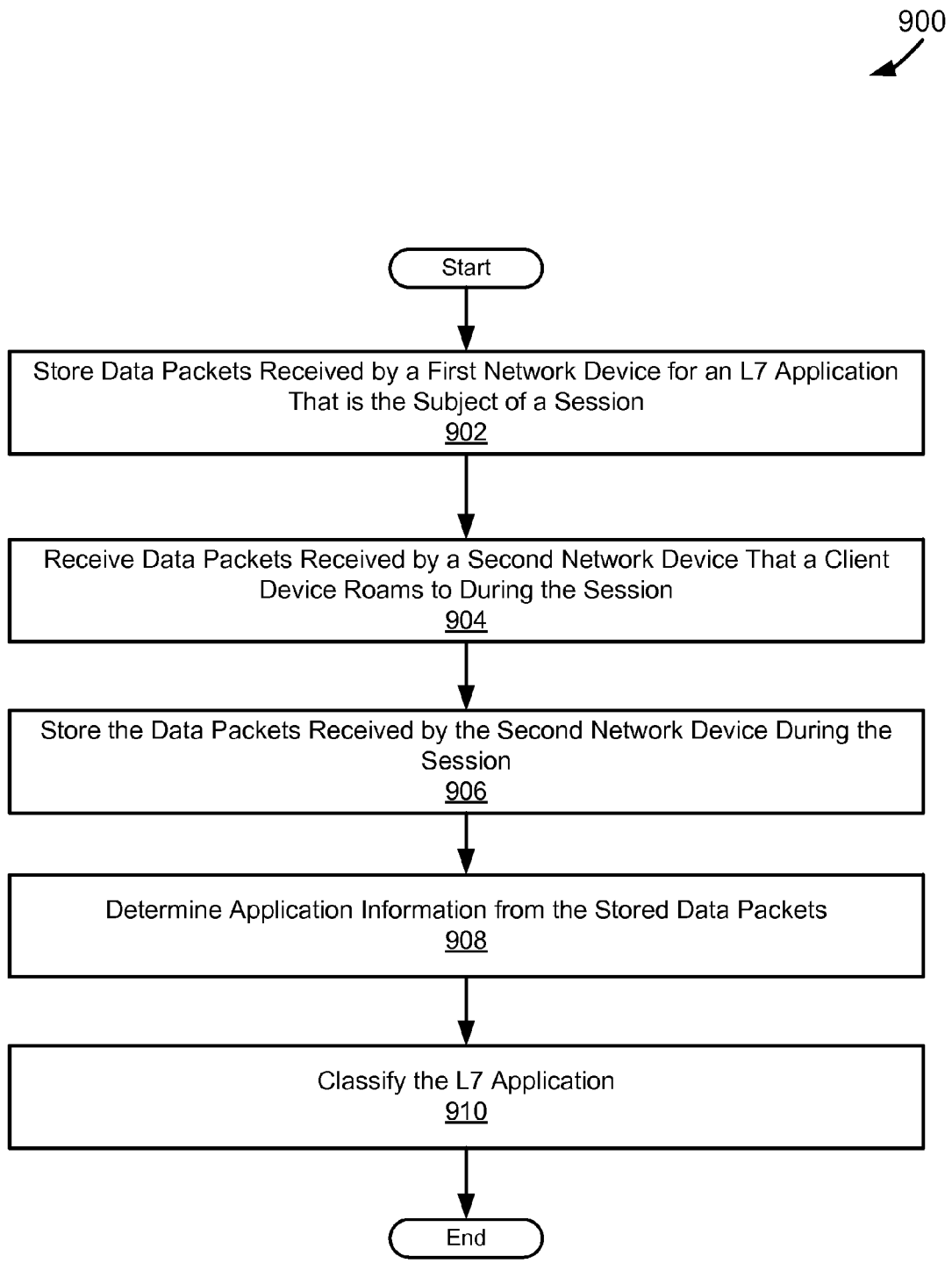
FIG. 9 depicts a flowchart of another example of a method for classifying an L7 application for maintaining L7 state as a client device roams during a session.

FIG. 9 depicts a flowchart 900 of another example of a method for classifying an L7 application for maintaining L7 state as a client device roams during a session. The flowchart 900 begins at module 902, where data packets or copies of data packets received by a first network device during a session are stored. Data packets received by a first network device during a session can be used to begin or continue execution of an L7 application that is the subject of a session on a client device. Data packets or copies of data packets can be stored by an L7 state synchronization system implemented, at least in part, on the first network device. Depending upon implementation-specific or other considerations, data packets or copies of data packets can be stored in a datastore implemented as part of the first network device, or implemented remote from the first network device, e.g. in the cloud.

The flowchart 900 continues to module 904, where data packets or copies of data packets received by a second network device that a client device roams to during a session are received. Data packets or copies of data packets can be received by a first L7 state synchronization system that is associated with or implemented, at least in part, on the first network device. A first L7 state synchronization system that is associated with or implemented, at least in part, on the first network device, can receive data packets or copies of data packets received by the second network device, from a second L7 state synchronization system that is implemented, at least in part on the second network device. Depending upon implementation-specific or other considerations, a first L7 state synchronization system, at least a part of which is implemented on the first network device, and a second L7 state synchronization system, at least a part of which is implemented on the second network device, can be part of the same L7 state synchronization system. Data packets or copies of data packets received by the second network device during the session can be received through a network tunnel.

The flowchart 900 continues to module 906, where the data packets or copies of data packets received by the second network device during the session and received at module 904 are stored. The data packets or copies of data packets received by the second network device during the session can be stored in the same datastore that the data packets or copies of data packets received by the first network device are stored at module 902. For example, the data packets or copies of data packets received by the second network device during the session can be stored in a datastore that is implemented on the first network device, or remote from the first network device, e.g. in the cloud.

The flowchart 900 continues to module 908, where application information is determined from stored data packets or copies of data packets. Application information can be determined from stored data packets or copies of data packets received by the first network device and the second network device during the session. Application information can be determined by analyzing data parts, and possibly headers, of data packets or copies of data packets received during a session. In analyzing data parts, and possibly headers, of the data packets or copies of data packets an applicable technique can be used to determine application information, e.g. DPI.

The flowchart 900 continues to module 910, where the L7 application that is the subject of the session is classified based on application information determined at module 908. Depending upon implementation-specific or other considerations, the application information determined at module 908 is enough to partially classify the L7 application, such that the L7 application is partially classified at module 910. Further depending upon implementation-specific or other considerations, the application information determined at module 908 is enough to completely classify the L7 application, such that the L7 application is completely classified at module 910. In various implementations, in using data packets received by both the first network device and the second network device as the client device roams between the first and second network devices during the session, L7 state is maintained during the session.

Figure 10:
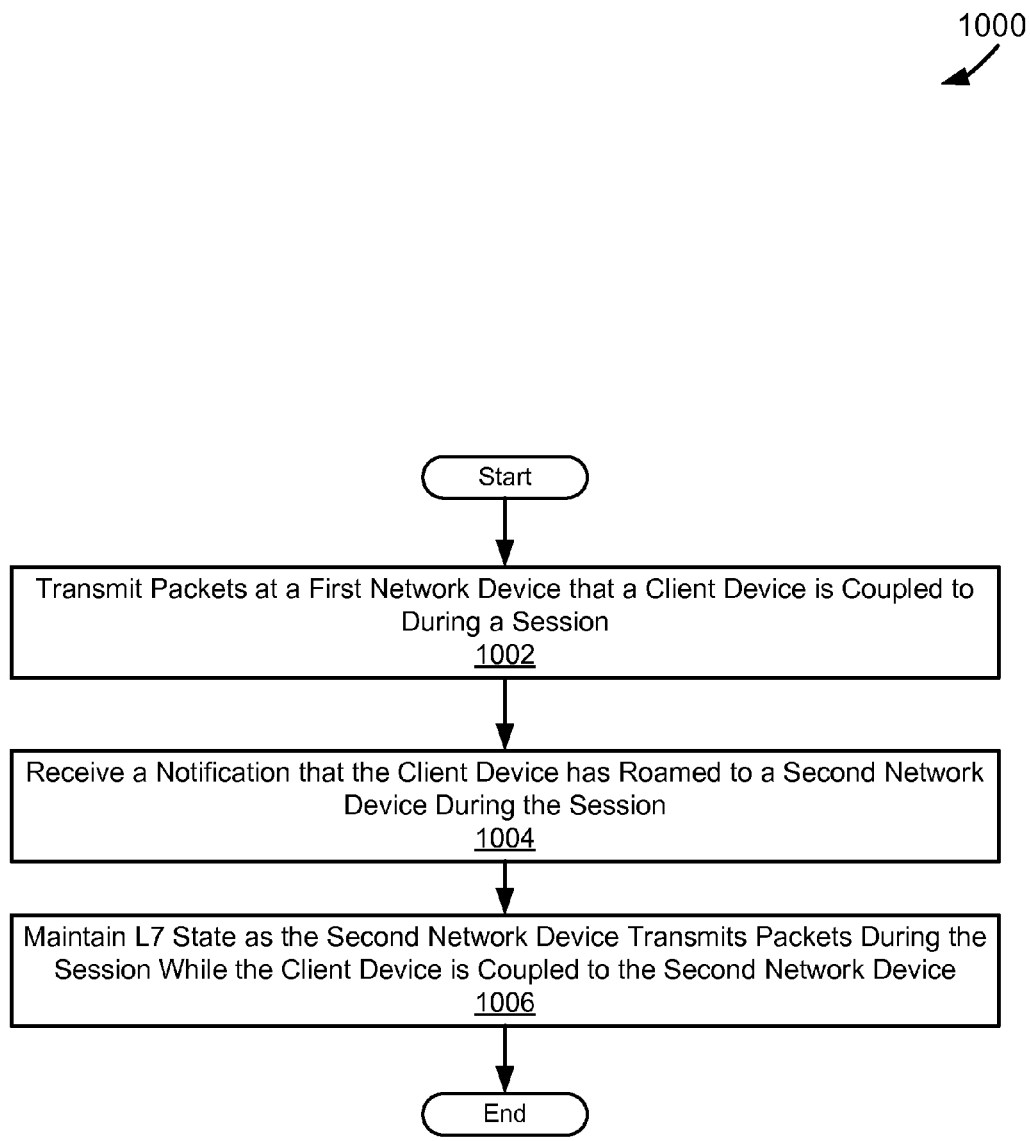
FIG. 10 depicts a flowchart of an example of a method for handling client device roaming during a session while maintaining state.

FIG. 10 depicts a flowchart 1000 of an example of a method for handling client device roaming during a session while maintaining state. The flowchart 1000 begins at module 1002, where packets are transmitted at a first network device that a client device is coupled to during a session. Packets transmitted at a first network device can be used in executing an L7 application that is the subject of a session.

The flowchart 1000 continues to module 1004, where a notification that the client device has roamed to a second network during the session is received. A notification indicating that the client device has roamed to a second network device can be received by an applicable system or portion of an applicable system for receiving the notification, such as the L7 state synchronization systems described in this paper. Depending upon implementation-specific or other considerations, a notification indicating that the client device has roamed to the second network device during the session can be received by a system that is implemented as part of the first network device or is associated with the first network device and implemented remote from the first network device, e.g. in the cloud.

The flowchart continues to module 1006, where L7 state is maintained as the second network device transmits packets for the session, while the client device is coupled to the second network device during the session. Depending upon implementation-specific or other considerations, L7 state can be maintained by sending an L7 application buffer to the second network device that is used, at least in part, to classify the L7 application that is the subject of the session at the second network device. Further depending upon implementation-specific or other considerations, L7 state can be maintained by sending packets, copies of packets, or portions of packets transmitted by the second network device during the session to the first network device, where the L7 application that is the subject of the session can be classified.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
receiving, at a first network device, one or more packets associated with a layer 7 application session of a client device;
storing at least a portion of each of the one or more packets received at the first network device in a layer 7 application buffer;
sending at least a subportion of the portion of at least one of the one or more packets stored in the layer 7 application buffer to a second network device;
determining application information for the layer 7 application from the at least a subportion of the portion of at least one of the one or more packets;
classifying the layer 7 application using the application information to maintain layer 7 state when the client device roams from the first network device to the second network device.

2. The method of claim 1, further comprising managing layer 7 application based features associated with executing the layer 7 application using a classification of the layer 7 application and policy information.

3. The method of claim 1, further comprising:
determining whether the layer 7 application is a prohibited application based on a classification of the layer 7 application and policy information;
if it is determined that the layer 7 application is prohibited, ending the session.

4. The method of claim 1, further comprising:
determining a priority level of the layer 7 application using a classification of the layer 7 application and policy information;
shaping traffic used in executing the layer 7 application on the client device based on the priority level of the layer 7 application.

5. The method of claim 1, further comprising:
generating session information using the at least a portion of each of the one or more packets in the layer 7 application buffer;
adding additional packets or portions thereof to the layer 7 application buffer to dynamically adjust a size of the layer 7 application buffer during the session based on the session information.

6. The method of claim 5, wherein the additional packets are received at the first network device.

7. The method of claim 5, wherein the additional packets are received at the second network device.

8. The method of claim 1, further comprising:
determining a classification level for the layer 7 application that will be achieved based on the portions of the packets included in the layer 7 application buffer;
determining whether the classification level for the layer 7 application is greater than or equal to a desired classification level;
if it is determined that the classification level for the layer 7 application is greater than or equal to the desired classification level, adding additional packets or portions thereof to the layer 7 application to dynamically adjust a size of the layer 7 application buffer during the session.

9. The method of claim 1, further comprising:
generating a confidence score that a desired classification level for the layer 7 application can be achieved based on the packets or portions thereof in the layer 7 application buffer;
determining whether the desired classification level for the layer 7 application can be achieved;
if it is determined that the desired classification level will be missed, adding additional packets or portions thereof to the layer 7 application buffer to dynamically adjust a size of the layer 7 application buffer during the session.

10. The method of claim 1, wherein the packets or portions thereof added to the layer 7 application buffer are copies of packets or portions thereof received by the first network device.

11. A system comprising:
a first layer 7 state synchronization subsystem configured to:
store one or more packets or portions thereof in a layer 7 application buffer, wherein the packets are part of a layer 7 application session between a first network device and a client device;
send at least a portion of the one or more packets or portions thereof to a second network device;
a second layer 7 state synchronization subsystem configured to:
determine application information from the at least a portion of the one or more packets or portions thereof;
classify the layer 7 application using the application information;
maintain layer 7 state when the client device roams from the first network device to the second network device.

12. The system of claim 11, further comprising a layer 7 application based features management engine implemented on or associated with the second network device, the layer 7 application based features management engine configured to manage layer 7 application based features associated with executing the layer 7 application using a classification of the layer 7 application and policy information.

13. The system of claim 11, further comprising a layer 7 application based features management engine implanted on or associated with the second network device, the layer 7 application based features management engine configured to:
determine whether the layer 7 application is a prohibited application based on a classification of the layer 7 application and policy information;
if it is determined that the layer 7 application is prohibited, end the session.

14. The system of claim 11, further comprising a layer 7 application based features management engine implanted on or associated with the second network device, the layer 7 application based features management engine configured to:
determine a priority level of the layer 7 application using a classification of the layer 7 application and policy information;
shape data traffic used in executing the layer 7 application on the client device based on the priority level of the layer 7 application.

15. The system of claim 11, wherein the first layer 7 state synchronization subsystem is further configured to:
generate session information based on packets or portions thereof included in the layer 7 application buffer;
add additional packets or portions thereof received by the first network device to the layer 7 application buffer to dynamically adjust a size of the layer 7 application buffer during the layer 7 application session based on the session information.

16. The system of claim 11, wherein the second layer 7 state synchronization subsystem is further configured to:
generate session information based on packets or portions thereof included in the layer 7 application buffer;
add additional packets received by the second network device to the layer 7 application buffer to dynamically adjust a size of the layer 7 application buffer during the layer 7 application session based on the session information.

17. The system of claim 11, wherein first layer 7 state synchronization subsystem is further configured to:
determine a classification level for the layer 7 application that will be achieved based on the packets or portions thereof included in the layer 7 application buffer;
determine whether the classification level for the layer 7 application is greater than or equal to a desired classification level;
add additional packets or portions thereof received by the first network device to the layer 7 application to dynamically adjust a size of the layer 7 application buffer during the session, if it is determined that the classification level for the layer 7 application is greater than or equal to the desired classification level.

18. The system of claim 11, wherein the second layer 7 state synchronization subsystem is further configured to:
determine a classification level for the layer 7 application that will be achieved based on the packets or portions thereof included in the layer 7 application buffer;
determine whether the classification level for the layer 7 application is greater than or equal to a desired classification level;
add additional packets or portions thereof received by the second network device to the layer 7 application to dynamically adjust a size of the layer 7 application buffer during the session, if it is determined that the classification level for the layer 7 application is greater than or equal to the desired classification level.

19. The system of claim 11, wherein the first layer 7 state synchronization subsystem is further configured to:
generate a confidence score that a desired classification level for the layer 7 application can be achieved using the packets or portions thereof included in the layer 7 application buffer;
determine whether the desired classification level for the layer 7 application can be achieved;
add additional packets or portions thereof received by the first network device to the layer 7 application buffer to dynamically adjust a size of the layer 7 application buffer during the session, if it is determined that the desired classification level will be missed.

20. The system of claim 11, wherein the second layer 7 state synchronization subsystem is further configured to:
generate a confidence score that a desired classification level for the layer 7 application can be achieved using the packets or portions thereof included in the layer 7 application buffer;
determine whether the desired classification level for the layer 7 application can be achieved;
add additional packets or portions thereof received by the second network device to the layer 7 application buffer to dynamically adjust a size of the layer 7 application buffer during the session, if it is determined that the desired classification level will be missed.

* * * * *